US010515362B2

(12) United States Patent
Radu et al.

(10) Patent No.: US 10,515,362 B2
(45) Date of Patent: Dec. 24, 2019

(54) METHODS AND APPARATUS FOR CARD TRANSACTIONS

(71) Applicant: MasterCard International Incorporated, Purchase, NY (US)

(72) Inventors: Cristian Radu, Beauvechain (BE); Fikret Ates, Namur (BE); Erik Lukas Ekselius, Overijse (BE); Sebastien Pochic, Brussels (BE); Fernando Lourenco, Kessel Lo (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/441,685

(22) PCT Filed: Nov. 19, 2013

(86) PCT No.: PCT/IB2013/060252
§ 371 (c)(1),
(2) Date: May 8, 2015

(87) PCT Pub. No.: WO2014/076686
PCT Pub. Date: May 22, 2014

(65) Prior Publication Data
US 2015/0287031 A1    Oct. 8, 2015

(30) Foreign Application Priority Data
Nov. 19, 2012   (GB) .................................. 1220780.9

(51) Int. Cl.
*G06Q 20/00* (2012.01)
*G06Q 20/40* (2012.01)
*G06Q 20/20* (2012.01)

(52) U.S. Cl.
CPC ............. *G06Q 20/40* (2013.01); *G06Q 20/20* (2013.01)

(58) Field of Classification Search
CPC ................................. G06Q 20/40; G06K 7/00
(Continued)

(56) References Cited

U.S. PATENT DOCUMENTS 4,859,837 A   8/1989   Halpern
5,434,395 A   7/1995   Storck et al.
(Continued)

FOREIGN PATENT DOCUMENTS

EP   1 555 638 A1   7/2005
EP   1 710 758 A1   10/2006
(Continued)

OTHER PUBLICATIONS

Kurokawa, Makoto et al., "Development of EMV Level2 Middleware Implementing IC Credit System", NEC Technical Journal, Vo. 1, No. 1, Mar. 1, 2006 (Mar. 1, 2006), XP55084361, Retrieved form the Internet: URL:http://www.nec.com/en/global/techrep/uournal/g06/n01/pdf/t060114.pdf, retrieved on Oct. 17, 2013, (pp. 63-66, 4 total pages).

(Continued)

*Primary Examiner* — Rokib Masud
(74) *Attorney, Agent, or Firm* — Buckley, Maschoff & Talwalkar LLC

(57) ABSTRACT

A secure payment system comprises a merchant POS client and a remote POS server. The merchant POS client comprises a reading device for reading a customer user token and for accepting transaction details and customer verification data, and also a computing device with access to a communications network and in communication with the reading device. The merchant POS client also comprises a merchant token associated with the remote POS server. The remote POS server is in communication with the merchant POS client through the communications network, and one or more elements of the merchant POS client business logic are (Continued)

assured by the remote POS server and not the merchant POS client. A merchant token for use in such a merchant POS client is described, as is a suitable reader device, and a method of conducting a transaction using such a payment system.

11 Claims, 17 Drawing Sheets

(58) Field of Classification Search
USPC .............................................. 705/64, 67, 18
See application file for complete search history.

(56) References Cited

U.S. PATENT DOCUMENTS

| 5,559,895 | A | | 9/1996 | Lee et al. |
|---|---|---|---|---|
| 5,679,007 | A | | 10/1997 | Potdevin et al. |
| 5,763,862 | A | * | 6/1998 | Jachimowicz ....... G06K 7/0013 235/380 |
| 5,917,168 | A | | 6/1999 | Nakamura et al. |
| 2002/0046185 | A1 | * | 4/2002 | Villart .................... G06Q 20/04 705/64 |
| 2005/0194454 | A1 | | 9/2005 | Ferber et al. |
| 2006/0064391 | A1 | | 3/2006 | Petrov et al. |
| 2009/0043702 | A1 | | 2/2009 | Bennett |
| 2009/0065571 | A1 | | 3/2009 | Jain |
| 2009/0272796 | A1 | | 11/2009 | Ong |
| 2009/0308925 | A1 | | 12/2009 | Kao et al. |
| 2009/0314840 | A1 | | 12/2009 | Granucci et al. |
| 2013/0173475 | A1 | * | 7/2013 | Lund ...................... G06Q 20/20 705/67 |
| 2013/0246259 | A1 | | 9/2013 | Dessert |
| 2014/0143543 | A1 | * | 5/2014 | Aikas .................. H04L 67/1097 713/168 |

FOREIGN PATENT DOCUMENTS

| GB | 2482663 A | 2/2012 |
|---|---|---|
| WO | 2011/056745 A1 | 5/2011 |
| WO | 2012/003892 A1 | 1/2012 |

OTHER PUBLICATIONS

Wikipedia, "Security token", Mar. 7, 2011 (Mar. 7, 2011), XP55031606, Retrieved from the Internet:URLP:http://en.wikipedia.org/w/index.php?title=Security_token&oldid=417616703, retrieved on Jul. 3, 2012, 14pgs.

"General PED Frequently Asked Questions", updated May 2010, Visa Public, XP55119152, retrieved from the Internet: URL:https://usa.visa.com/download/merchants/cisp-pin-entry-device-faq.pdf, retrieved on May 21, 2014, (pp. 1-7, total 7 pages).

"PCT International Search Report", dated Jun. 24, 2014, for International Application No. PCT/IB2013/060252, 9pgs.

* cited by examiner

METHODS AND APPARATUS FOR CARD TRANSACTIONS

CROSS-REFERENCED TO RELATED APPLICATION

This application is a U.S. National Stage Filing under 35 U.S.C. § 371 and 35 U.S.C. § 119, based on and claiming priority to PCT/IB2013/060252 for "METHODS AND APPARATUS FOR CARD TRANSACTIONS" filed Nov. 19, 2013, claiming priority to GB Patent Application No. 1220780.9 filed Nov. 19, 2012.

TECHNICAL FIELD

This disclosure relates generally to methods and apparatus for card transactions. In preferred embodiments, the disclosure provides methods and apparatus to allow a merchant to make card transactions supported by a payment service provider with easy enrolment and cheap acceptance equipment.

BACKGROUND

Merchants accepting payment credit card transactions from a physical payment card are generally required to acquire or lease a point-of-sale terminal (POS) from a bank or payment service provider (PSP). Such payment cards may be credit cards or debit cards, or other similar instruments (such as prepaid cards, e-purses, etc.). A PSP is an intermediary who provides payment services to merchants, and can aggregate payments for interaction with transaction acquirers (generally banks). The POS is a computational device adapted to process information and to communicate with the merchant's bank or PSP, and it also contains a credit card reader and a user interface. The credit card reader will typically be adapted to read an EMV chip in a credit card, and to implement the EMV workflows. It will also need to comply with relevant standards for reading of credit cards, such as ISO/IEC 7816 for contact cards and ISO/IEC 14443 for contactless cards.

The POS not only needs to perform these tasks, but it needs to do so securely to minimise the risk of fraudulent transactions or fraudulent behaviour from any party involved with a transaction or potentially able to observe it. A conventional POS is therefore costly to produce, and this cost is generally passed on directly or indirectly to the merchant in high rental fees or high transaction charges.

Where a merchant is involved in a large number of credit card transactions, the costs associated with a POS may not be significant for the merchant, and may be offset by speed and convenience in making a credit card transaction through an optimised system. For merchants who are involved in only occasional credit card transactions, the cost of a conventional POS may be a deterrent to its use. Consequently such merchants will often not accept credit card payments at all, which is an unwanted constraint on the merchant's ability to accept payment. Alternatively, such merchants may only accept credit card payments virtually through an online provider—this is not convenient in a physical store and has a different set of associated fraud risks.

There are a significant number of merchants falling into this category. Many will previously have preferred payment by personal cheque, but as banks are now attempting to scale back or even eliminate the personal cheque, this option may no longer be available.

It is therefore desirable to provide methods and apparatus to enable a merchant to accept physical credit card payments without a conventional POS but in such a way that the transactions are convenient, effective and secure.

SUMMARY

In a first aspect, the present disclosure provides a secure payment system, comprising a merchant POS client and a remote POS server, wherein the merchant POS client comprises a reading device for reading a customer user token and for accepting transaction details and customer verification data and a computing device with access to a communications network and in communication with the reading device, and wherein the merchant POS client further comprises a merchant token associated with the remote POS server, and wherein the remote POS server is in communication with the merchant POS client through the communications network, whereby one or more elements of the merchant POS client business logic are assured by the remote POS server and not the merchant POS client.

Elements of the merchant POS client business logic include workflows, rules and assets required as a part of merchant POS client operation.

Using this approach, a low cost POS client can be constructed which is efficient to use but will still provide acceptable security to all parties involved in the transaction.

Preferably, the customer user token is a credit card or a debit card and wherein the reading device comprises a card reader—the card reader may for example comprise a chip card reader adapted to read an EMV chip. Embodiments of the disclosure are however adapted for use with cards which have only a magnetic stripe.

Preferably, the secure payment system comprises a secure channel from the merchant POS client to the remote POS server. An effective way to achieve this is if the merchant POS client further comprises a merchant token associated with the remote POS server to establish the secure channel.

In a particularly preferred approach, the merchant token is a merchant display card comprising a secure keyboard and a display, in which case the merchant display card is adapted to receive and encrypt a PIN through the secure keyboard. As is described in embodiments below, this is a particularly effective approach in countering the full range of threats to a POS system.

In some embodiments, the computing device is a personal computer. In others, the computing device is a smartphone, which may be an NFC enabled and is adapted to receive contactless payments.

In this aspect, the present disclosure further provides a server programmed to operate as a remote POS server in the secure payment system set out above, and a combination of a computing device and a reading device programmed to operate as a merchant POS client in the secure payment system set out above.

In a second aspect, the present disclosure provides a merchant token comprising a display, a secure data entry device, a processor, and a memory for reading by a reading device, wherein the processor is adapted to receive merchant data through the secure data entry device to activate the merchant token for transactions, and the processor is adapted to receive customer data through the secure data entry device and to encrypt the received customer data for storage in the memory for reading by the reading device.

This component is particularly advantageous to address the problems of the prior art, as it enables threats to a POS system to be addressed effectively at low cost while providing a high level of assurance to the customer.

Preferably, the secure data entry device is a secure keypad, and the merchant token is adapted for the received customer data to be a personal information number. This can be used, for example, for providing customer verification of a transaction amount.

The merchant token may be adapted to establish a secure channel to a remote server with which the merchant token is associated. This allows effective cooperation between a merchant POS client and a remote POS server. The merchant token may also be adapted to initialise a merchant POS client.

In a third aspect, the present disclosure provides a credit card reader comprising: a slot for reading a chip of a transaction card, and a second slot for reading a chip of a merchant card.

In a fourth aspect, the present disclosure provides a method of conducting a transaction at a merchant POS with a customer having a customer token, the merchant POS comprising a reading device for reading user tokens and for accepting transaction details and customer verification data through a secure data entry device, a merchant token and a computing device with access to a communications network and in communication with the reading device, the method comprising: entering transaction details at the merchant token through the secure data entry device; the customer validating the transaction details at the merchant token with customer validation data through the secure data entry device; the reading device reading the transaction details and the customer validation data from the merchant token and the merchant POS providing them to a remote POS server over a communication channel; using the merchant POS with the user token to produce transaction payment data, the reading device forwarding the transaction payment data to the remote POS server over the communication channel for transaction authorisation to be obtained.

BRIEF DESCRIPTION OF FIGURES

Embodiments of the disclosure will now be described, by way of example, with reference to the accompanying Figures, of which.

DESCRIPTION OF SPECIFIC EMBODIMENTS

Figure 1:
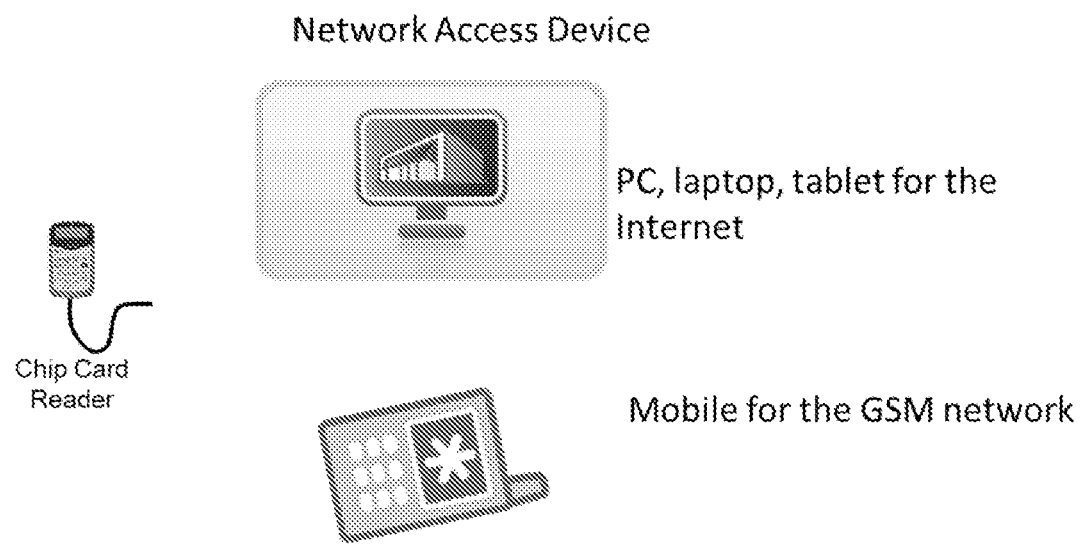
FIG. 1 shows basic elements usable in a merchant system according to embodiments of the disclosure.

Specific embodiments of the disclosure will be shown below with reference to the Figures. The basic elements of a merchant POS for use in embodiments of the disclosure are shown in FIG. 1. These include a computing device (also described here as a network access device), which may in different embodiments be a PC or tablet 1 or a smartphone 2, and a reading device such as a chip card reader 3. The network access device has access to a communications network, for example the public internet or the GSM network.

Figure 2:
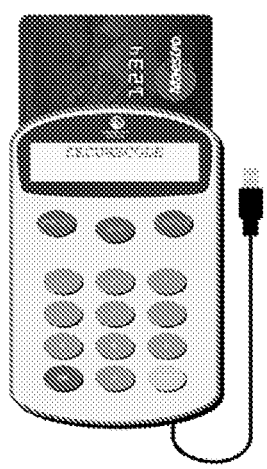
FIG. 2 shows a chip card reader adapted for use in embodiments of the disclosure.

An exemplary chip card reader 3 is shown in FIG. 2. This has a slot for receiving a user token such as a customer credit card 5, and a connection 11 to the network access device (this is shown as a wired connection here, though it may in principle be a wireless connection).

The chip card reader 3 in embodiments of the disclosure does not have all the functionality of a conventional POS device (which includes a chip card reader and other computational, cryptographic and communication components). The functional roles of the network access device and the reader device are as follows:

Network Access Device

The merchant's IT and communication backbone;

Used for hosting merchant's software applications (e.g for accounting, tax computation, stock management, ordering tools, provider databases, customers databases, Internet browsing, email, communication by voice, text data)

Used as hub for gathering the electronic transactions of the merchant and for routing them to the appropriate PSP or directly to the transaction acquirer.

Reader Device

The reader device—typically a Chip Card Reader (CCR)—augments the Network Access Device and acts to accept user tokens such as credit cards, supporting the following functions:

Keying in transaction details (amount, currency), performed by the merchant;

Displaying the transaction details to the cardholder;

Reading the cardholder's data (Personal Account Number (PAN), expiration date) from one of the payment card's data containers (e.g. from the embossed/printed data on the front through manual typing, from the magnetic stripe through electronic reading, or from the EMV chip through electronic reading);

Obtaining the card authentication data (e.g., Card Verification Codes such as the CVC1 of a magnetic stripe, the online CAM by the ARQC cryptogram in the case of an EMV chip, or the offline CAM through the chip's signature);

Obtaining the cardholder verification data, as a signature or a PIN.

While in embodiments the reader device may be provided only to use an EMV chip, the embodiments described here not only can read the EMV chip of the Cardholder's card on the contact interface and on the contactless interface, but it also provides fallback interfaces for reading a magnetic stripe and for manually keying in the card's main financial parameters as PAN and expiration date.

For reference below, the different assets associated with a transaction involving a merchant POS of this type are as follows:

Payment Card (Customer Token) Assets

AC0—Physical card.

AC1—Cardholder data—Cardholder Name, PAN, expiration date, service code.

AC2—Authentication data:
  AC21—Static Card Authentication data, which may range from a static pre-computed cryptogram written on the card (CVC2), full magnetic stripe data, including the pre-computed CAM cryptogram (CVC1) or equivalent on a chip, or pre-computed cryptograms computed with asymmetric public key cryptography (SDA).
  AC22—Dynamic Card Authentication data, which consists of the fresh computed cryptograms generated by the card with either symmetric key cryptography (e.g., Application Cryptogram) or asymmetric public key cryptography (CDA or DDA signature on an unpredictable number).

AC3—Cardholder Verification data, like a hand signature pattern or a Personal Identification Number (PIN).

Merchant POS Assets

AP1—Terminal configuration data—Merchant ID, Merchant Name and Location, Merchant Category Code, Acquirer ID, Terminal Type, Terminal Country Code, Terminal Capabilities, Additional Terminal Capabilities, Security Capability, Card Data Input Capability, etc.

AP2—Brand parameterization data—Terminal Action Codes, Floor Limits, Contactless Floor Limits, Contactless Transaction Limit, CVM Required Limit, etc.

AP3—Code of the payment application—Random Number Generator (RNG), CVM Results, offline CAM verification, etc.

Transaction Assets

AX1—Amount of transaction, Transaction Currency Code, Transaction Currency Exponent.

Particular threats are associated with different assets and apply to different system elements and system configurations—these will be described below where relevant, for example to illustrate why a specific system choice has been made. The following elements all provide security mechanisms in embodiments described below:

Virtual POS architecture (V-POS)—protects AP1, AP2 and AP3;

Secure Channel and Merchant Card—protects AC0, AC1, AC22 and AC3;

Secure Reader—protects AC1 and AC21

Secure PIN entry—protects AC3;

Cardholder Transaction Acknowledgement—protects AX1.

These elements are all described in more detail below.

Figure 3:
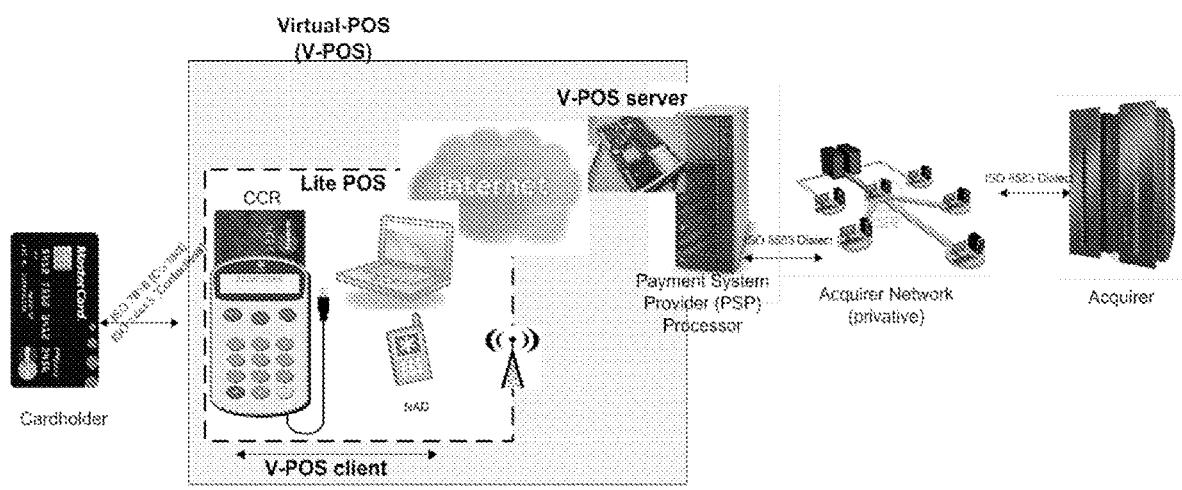
FIG. 3 shows a virtual POS system architecture in accordance with embodiments of the disclosure.

Firstly, a Virtual POS architecture will be described with reference to FIG. 3.

The Virtual POS 10 distributes the functionality of a conventional POS between several different components. The cardholder card 5 interacts with the credit card reader 3 in a conventional manner, but whereas in a conventional POS the credit card reader is integrated within a secure computing device capable of a range of functionalities, in the Virtual POS the credit card reader 3 has a much more limited functionality. The credit card reader 3 interacts with the network access device (such as laptop computer 1 or smartphone 2) to form a client of the Virtual POS 10 (also termed here as Lite POS). The Virtual POS client communicates over an appropriate communications network, such as the public internet 6, with a Virtual POS server 7. In this case, the Virtual POS server 7 is associated with a PSP (although in other embodiments it could be associated with an Acquirer rather than a PSP). Certain aspects of POS functionality are provided at the Virtual POS server 7 and not at the Virtual POS client—in particular, one or more elements of the Virtual POS client are assured by the Virtual POS server and not by the Virtual POS client. As is discussed below, this shields the Virtual POS client from certain types of attack. The PSP communicates with an acquirer 8 through a secure or otherwise controlled acquirer network 9 in a conventional manner.

As indicated above, functionally the Lite POS integrates with the PSP processor to create a Virtual POS (V-POS). This allows the Lite POS logic to be greatly simplified as compared to a conventional POS—this can be done because the V-POS client can rely on the PSP for the more demanding payment logic—the V-POS server can be implemented on the processor's specialized server—other added value business logic (such as loyalty programs, coupons, etc) may be implemented here too. The V-POS server sends commands from the payment application to the V-POS client, which in turn relays these commands to the cardholder's card to obtain the payment proof required by the transaction.

In a V-POS configuration, the Lite POS may be provided at low cost and it can be shielded from the complex processes for operational management required by a traditional POS, such as:

configuring the POS according to an acquirer contract;

parameterizing payment applications as required by the acceptance of various card brands;

maintaining payment applications;

adding new applications, (e.g., loyalty, coupons, etc.) as required by developments in the retail payment services.

The use of a simple POS logic in the merchant POS client means that processes involving the merchant POS client are not complex. This may improve both the merchant experience and the customer experience, thus leading to acceptance of use of payment cards in new environments. The network environment will generally allow for contact between the V-POS client and server—for practical purposes, the Lite POS may be considered an online-only terminal as the network connection will typically be available essentially all the time.

In addition to shielding the Lite POS from complex operational management, the V-POS architecture also allows delegation of security measures from the Lite POS—V-POS client—to the V-POS server. Thus, the security of certain merchant POS (also described here as Point of Interaction, or POI) assets, such as configuration parameters data (AP1), brand parameters data (AP2), and the payment application code (AP3), is assured by the V-POS server and not by the Lite POS. The removal of the need to assure these assets significantly decreases the cost of the Lite POS. These assets therefore cannot be attacked on the network access device or the credit card reader.

This delegation of security features from the Lite POS (V-POS client) to the V-POS server (PSP processor) is accompanied by the use of strong security mechanisms for the V-POS server. It is more appropriate to use such mechanisms at the V-POS server as there is one server serving many clients—such mechanisms may be needed to protect the V-POS server against penetration from the Internet (for example, by hackers). Attacks such as replay attacks, downgrading of security and relayed transactions can be protected against as a result.

The next approach to prevention of threats is the use of a secure channel and a merchant card. The secure channel is described in FIGS. 4 and 5, whereas the addition of a merchant card is discussed with reference to FIG. 6.

One consequence of using the V-POS architecture, and in particular of the use of the V-POS server to assure POI assets, is that security mechanisms are needed to ensure that commands to the CCR are from the legitimate PSP's V-POS server and not from the server of an attacker, so interactions of the CCR with the customer card are not compromised. This would prevent relaying of payment card data and dynamic authorisation data to a malicious merchant, for example.

In embodiments, this is done by implementing a command filter at the CCR to protect the EMV chip card and its applications against malicious access from the PC. This prevents customer card data being used for unsolicited transactions.

Figure 4:
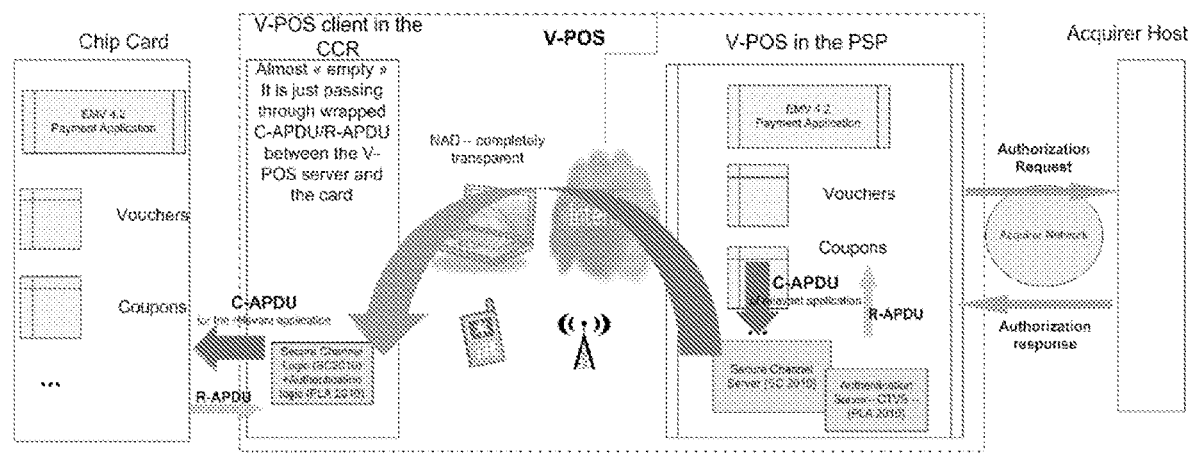
FIG. 4 illustrates the use of a secure channel in the virtual POS system architecture of FIG. 3.
Figure 5:
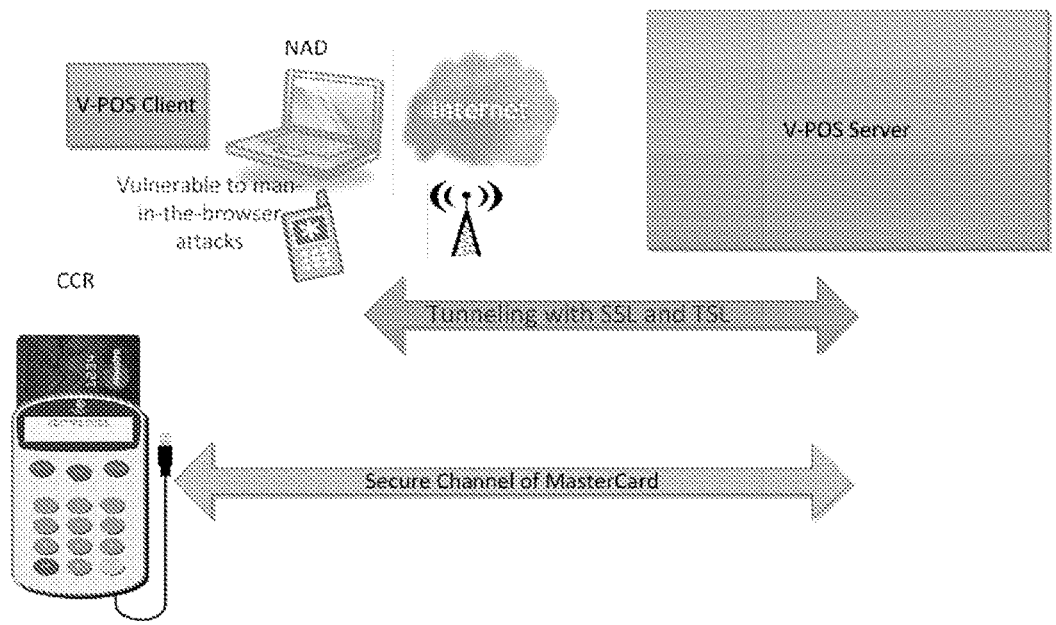
FIG. 5 compares schematically the secure channel of FIG. 4 with conventional SSL or TSL tunnelling.

Moreover, commands and responses sent between the V-POS client and the V-POS server should be protected from eavesdropping and from session hijacking. This is achieved by use of a secure channel between the V-POS client and the V-POS server, as shown in FIG. 4. In the FIG. 4 arrangement, this is done by establishing a Secure Channel layer between a CCR 3 that implements PLA 2010 and SC 2010 technology (from Mastercard), and a corresponding CAP Token Verification Server (CTVS) security server for authentication using PLA 2010 technology and a SC2010 server for Secure Channel piloting, with appropriate storage of the cryptographic keys used for its operation in the Host Security Module (HSM). FIG. 4 shows the interactions between the different system elements in more detail. Both the CTVS server and the SC2010 server are represented here as being within the Virtual POS server 7, though as the skilled person will appreciate these servers may reside elsewhere in the network if appropriate provided that appropriate security considerations are observed. PLA 2010 and SC 2010 technologies are known to the person skilled in the art and are not described further here.

Alternative secure channel solutions are available, such as use of an SSL or TLS secure tunnel implemented on the PC 1, which is widespread. The approach shown in FIG. 4 is preferred, as it circumvents the PC entirely, and the PC 1 is significantly more likely to be affected by malware than the CCR 3. This is shown schematically in FIG. 5.

As indicated earlier in this specification, there are practical difficulties for merchants with low transaction volumes in getting access to card acceptance services without inappropriately onerous commitments with transaction acquirers such as banks. Some mitigation is provided by such merchants mediating their relationships with acquirers through Payment System Providers (PSP) (e.g., DataCash). A PSP 7 will have an "umbrella" acquiring contract with the acquirer and an appropriate network link 9 to the acquirer host 8, as shown in FIG. 3.

Figure 6:
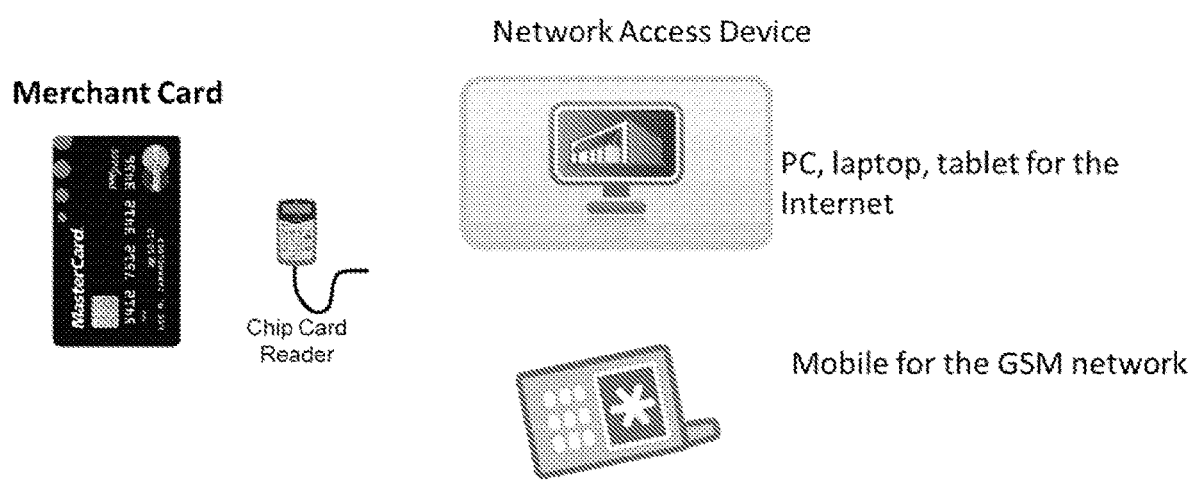
FIG. 6 shows the elements of a merchant system as shown in FIG. 1 with the addition of a merchant card, in accordance with further embodiments of the disclosure.

For the relationship between PSP and merchant to provide appropriate benefits, it is desirable for it not to replicate a traditional contract for card acceptance services. In embodiments of the disclosure, a PSP enrolls merchants in a card program, and provides the merchant with a pre-paid merchant card 12. As shown in FIG. 6, the merchant card 12 is used as an additional element to the elements shown in FIG. 1.

The value of a merchant card is not nominal—it will typically be preloaded with a value corresponding to a certain amount of transaction cost, with subsequent transaction costs being debited from the card by the PSP. Funds may subsequently be transferred from the merchant account associated with the merchant card 12 to other accounts, but in such a way as always to leave a positive credit balance associated with the merchant card 12. This is practical as the merchant card 12 will see an increase in value from transactions, as merchant card transactions will involve receipt of funds from a customer. The use of such a card follows broadly the same model as use of pre-paid SIM cards in mobile telecommunications networks.

The PSP runs corresponding Integrated Processing Solutions (IPS) in which it manages a separate pre-paid account for each merchant card. In order to activate the merchant card, the merchant registers it on the IPS. This links the card to a simplified acquiring contract, storing Merchant ID, Merchant Name and location, and similar details.

The establishment of an operational secure channel between the merchant and the PSP may be based, for example, on a cryptographic key stored in the merchant card and a corresponding key in the Secure Channel Server's Hardware Security Module (HSM). For a merchant who has many transactions, it may be most convenient to initiate the secure channel once a day, when the Merchant activates his Lite POS. If the number of transactions accepted by the merchant is small, it may be preferable to initiate the secure channel anew for each transaction.

Using this arrangement, every payment transaction performed with a cardholder's payment card within a secure channel session may be linked to the Merchant account with the IPS and that account will be credited for each approved authorized transaction performed with the cardholder card. That account is debited for the payment of the merchant service subscription and of the transaction fees. The PSP creates a pool account with the money due from settlement of the authorized transactions, from which each merchant account will be credited at the end of a clearing/settlement period.

The merchant card 12 thus augments the CCR 3 in the same way that the chip card reader 3 augments the network access device.

To provide protection of assets AC1 and AC21 against dishonest merchants, the CCR 3 needs to provide security against local subversion.

One feature of such security is tamper detection and reaction—in this way a mechanism is set against attempts have been made to open the CCR 3 and install code to subvert operation of the CCR and capture cardholder information as a precursor to producing counterfeit cards. One approach to improving security in the CCR 3 is simply to remove the magnetic stripe reader, as this technology is particularly susceptible to hacking. A compact CCR 70 meeting these requirements fully is shown in FIG. 7—it would however be desirable to produce a less expensive solution at a lower price point to meet the commercial requirements for a merchant POS.

Another way to achieve a secure CCR is to make it difficult or impossible to install new software in the CCR once the Lite POS is operating with the Merchant. This is achievable as Secure Channel specifications are stable and do not require software patches—any revisions would be by new software version releases corresponding to renewal of the Lite POS. This can be used to protect the assets AP1, AP2, and AP3. This is particularly important if any of the V-POS server functionality should be moved back to the CCR (for example, for acceptance on the contactless interface).

However, if automated update of the CCR firmware and software by patching must be implemented, then the CCR should verify the integrity and origin of any CCR software update before applying it. This would increases the price and complexity of implementation, as symmetric key or public key mutual authentication mechanisms between the CCR firmware and the PSP Load Server would have to be implemented in the CCR. In embodiments containing this feature, the cryptographic keys required to perform this operation would need to be held in a secure memory module within the CCR.

Figure 7:
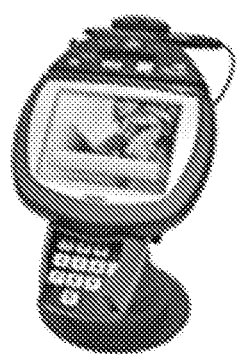
FIG. 7 shows one embodiment of a chip card reader for use in embodiments of the disclosure.

While providing a secure CCR as shown in FIG. 7 is one approach to resisting threats such as a counterfeiting attack, other embodiments of the invention employ different approaches. Such an attack requires reading and copying of not only cardholder data and static card authentication data, but also cardholder verification data. The secure CCR approach protects cardholder data and authentication data (obtained for example through the magnetic stripe on the card), but at considerable implementation cost. An alternative approach is to protect the cardholder's PIN against a dishonest merchant—if this is done, a counterfeiting attack can be countered without the expense of a secure CCR. In the discussion that follows, the cardholder's PIN is used to indicate any cardholder verification data (such as biometric information, for example), but it will be understood that this could refer to additional or alternative customer verification data as well.

Figure 8:
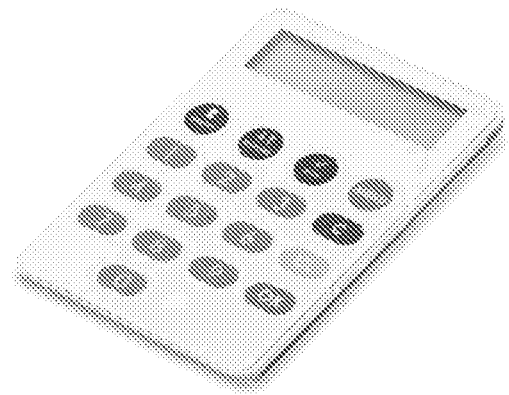
FIG. 8 shows a secure keypad for use as a PIN encryption device in embodiments of the disclosure.

One approach is to use a secure keypad 13 for the CCR—this is shown in FIG. 8. A secure keypad solution (PIN Pad) is built in to a conventional merchant POS in a conventional POI. The "secure" PIN Pad is used by the cardholder to type in the online PIN for magnetic stripe transactions or the offline PIN for chip card transactions. The attribute "secure" refers both to tamper resistance of the PIN Pad against penetration attempts, required for the use of the offline PIN, but also because it provides the capability to encrypt the PIN with a secret key shared between the PIN Pad and the acquirer/PSP that receive the transactions, a capability required for use of the online PIN. The secure PIN Pad can thus be termed a PIN Encryption Device (PED). To meet relevant standards requirements it needs PCI PST certification. A PED is thus an expensive component of a conventional POS and is a primary factor in determining the price and operational cost of the POS.

In preferred embodiments of the invention, a different approach to secure PIN entry is taken. This is to circumvent the need for using a secure PIN Pad or PED at the CCR by associating PIN entry with the card—that is, providing Card Verification Method (CVM) capability at the card itself. A card with such a capability is shown in FIG. 9.

Figure 9:
FIG. 9 shows a display chip card with keyboard for use in embodiments of the disclosure.

FIG. 9 shows a display chip card 90 comprising an EMV chip 91, a keyboard 92 and a display 93. As will be discussed further below, integration of the keyboard 92 and the display 93 can be achieved in such a way as to provide sufficient security—and a sufficient assurance of security—that the threats required for a counterfeiting attack can be mitigated. Cards of this type are further described in EP 2369526 A1, the contents of which are incorporated by reference to the extent permitted by applicable law.

Using such a device, the following cardholder verification method can be used. When required, the cardholder types the PIN on the keyboard of his or her display chip card, thus preventing exposure of cardholder verification data. The PIN is locally verified in the chip and a PIN Verification Status (PVS) flag is set in the permanent memory of the chip. When interacting with the card, the merchant POS terminal (for whatever type of merchant POS is used—this method can apply to a conventional merchant POS) is informed that the CVM is enabled on the cardholder's card, so does not need to be carried out with the keyboard of the POS terminal. After this, the POS terminal sends a message to the card with the assumption "PIN verified correctly". On receiving this statement, the chip verifies the status of the PVS, and if the status is set to indicate successful verification then the relevant EMV process is followed to indicate cardholder verification—for example, the transaction may be given a transaction certificate (TC) for offline authentication or an authentication request cryptogram (ARQC) may be generated if online authentication is required. If the PVS status is not satisfactory, the transaction is declined locally with an application authentication cryptogram (AAC).

It is known to use a mobile telephone as a cardholder CVM-enabled device. Such devices may for example implement the mobile PayPass M/Chip application, which has been used for high value transactions in PayPass Reader 3.0. There is no direct equivalent presently available for a display card, though one possible approach would be for the PSP to implement PayPass Reader 3.0 to support cardholder CVM-enabled devices for certain chip transactions. Such an approach would be limited to chip cards only, and migration of cardholders to a more expensive display chip card solution (costing several dollars, rather than about a dollar) may be difficult to achieve.

Figure 10:
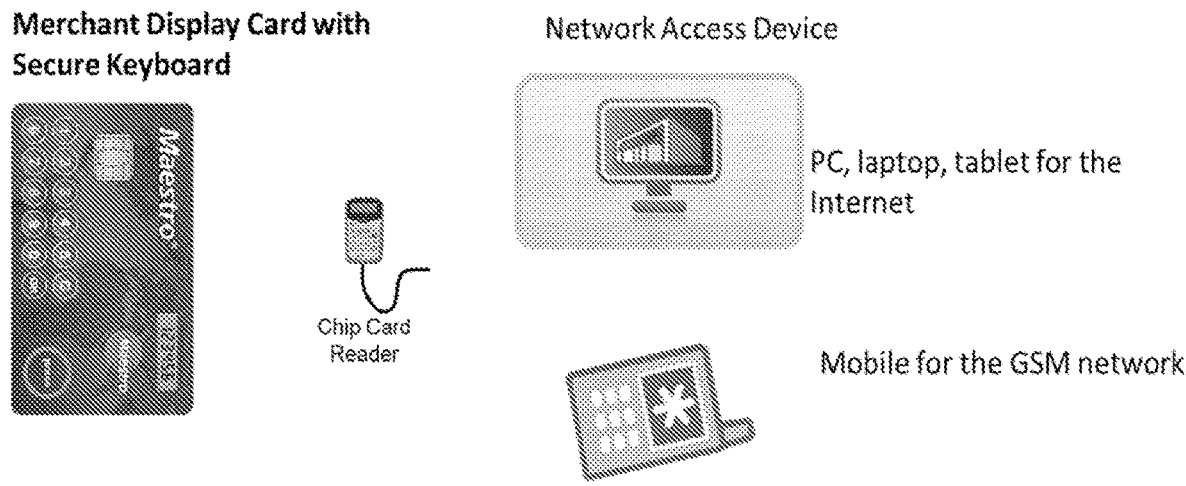
FIG. 10 shows the elements of a merchant system as shown in FIG. 6 with the merchant card replaced by a merchant display card with secure keyboard, in accordance with further embodiments of the disclosure.

In a particularly preferred embodiment of the invention, cardholder verification is achieved not by requiring a cardholder display chip card but instead by using a merchant display card with a secure keyboard. This only requires the merchant and not the cardholder to meet the additional card cost. This is a CVM-enabled device, which is shared with and built on top of a merchant card as previously described. The keyboard is made "secure" to provide assurance to the cardholder (and other parties associated with the transaction) that a dishonest merchant cannot access the cardholder's PIN. FIG. 10 shows such a merchant display card 12*a* as one of the system elements of a merchant POS system.

In this approach, the cardholder's PIN is captured and encrypted by the merchant card and is then sent online, using the secure channel described above, to the PSP. The envelope containing the encrypted PIN is sent to the PSP's V-POS server. When performing an EMV transaction, the V-POS server decides on the Cardholder Verification Method it may use, depending on the CVM List received from the cardholder's card in accordance with normal EMV procedures:

- If the CVM chosen is online PIN, the V-POS treats the encrypted PIN as for an encrypted PIN received from a regular POS.
- If the CVM chosen is offline PIN, the Hardware Security Module (HSM) of the V-POS will decrypt the envelope containing the encrypted PIN sent by the merchant card, package it within a VERIFY PIN command, and submit it to the secure channel with the encryption service activated back to the CCR for execution by the cardholder's card.

In preferred embodiments of the invention, a merchant that accepts transactions requiring a cardholder's PIN is equipped with a merchant card implemented as a display chip card with a secure keyboard.

In this arrangement, it is desirable for the following security requirements to be implemented by the vendor of the merchant card and by the PSP acquiring the transactions:

The merchant card is tamper responsive

The merchant card should be equipped with a tamper-detection mechanism that detects any attempt by a dishonest merchant to penetrate it and physically subvert it, for example by inserting a microcomputer to spy on the key taps of a genuine merchant card's keyboard. The merchant card should also be provided with a tamper-responsive mechanism. Preferably, operation of the mechanism immediately disables the card and results in the automatic and immediate erasure of any sensitive PIN data that may be stored in the card, preventing its recovery by an attacker. One approach to this is to implement the display card keyboard within a tamper resistant chip.

The merchant card is defended against cloning.

In particular, it should be difficult to clone a merchant card at all, and any cloning attack should have to operate card-per-card. This is achievable as:

- The merchant card chip, and all its cryptographic material, are issued by the PSP and the chip is used for the authentication of a merchant when the PSP acquires its transactions. Any successful cloning attempt would thus require disassembly of a genuine merchant card and reuse of its chip in a cloned display card with a microcomputer adapted to spy on the cardholders' PIN. Repackaging of a display chip card is a complex task and would be very difficult for a cloner to achieve—the incentive to do so would be very low as cloning would need to be carried out card-by-card.
- The cloned card must have the "look and feel" of a genuine card, including the brand watermark on the front of the card. The cardholder will be able to inspect this visually before typing in his PIN on the secure keyboard of the card.

The merchant card implements symmetric key encryption

In particular, the merchant card should implement a symmetric key mechanism in chip. This encryption mechanism can create a secure envelope to contain the cardholder's PIN which has been typed into the secure keyboard of the merchant display card. This secure envelope is transmitted by the merchant card through the Lite POS by means of the secure channel to the PSP. The PSP is responsible for the encryption keys in the merchant card's chip as well as any other keying material required for merchant authentication, secure channel establishment, etc.

The PSP implements effective fraud detection and reaction

The implementation of such a mechanism represents a second level of security if the merchant card's secure keyboard is circumvented. This is a reasonable expectation, since currently all acquiring organizations currently use fraud detection and reaction tools to provide security for existing merchant POS terminals accepting magnetic stripe payment cards.

Figure 11:
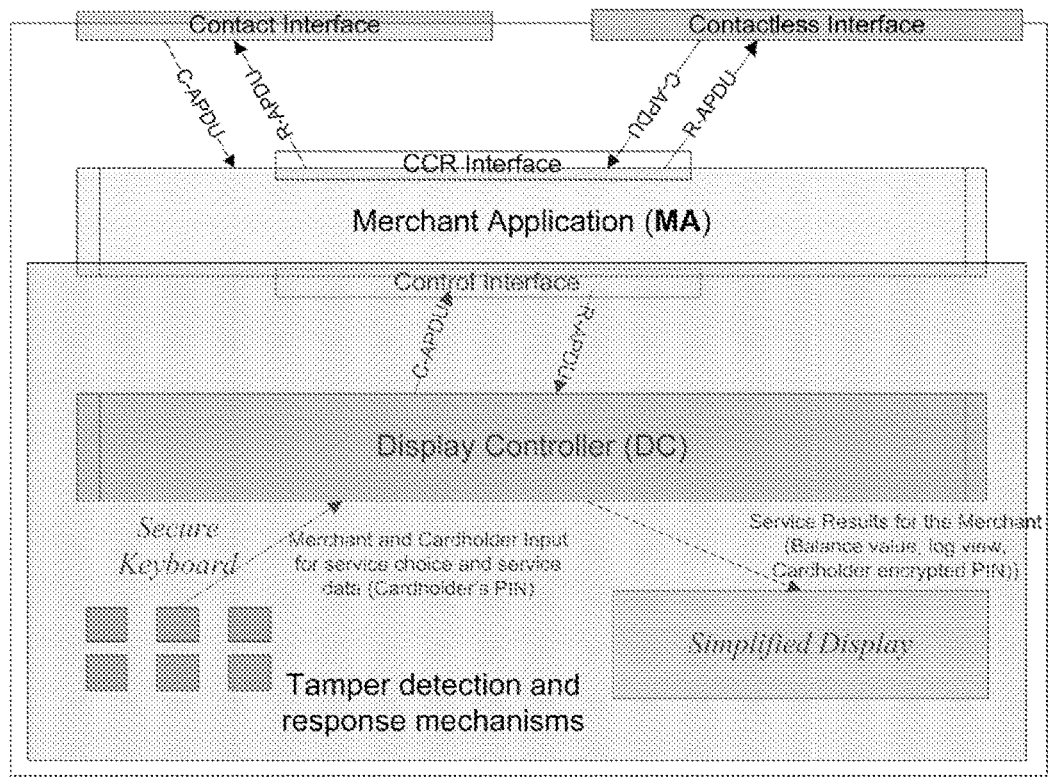
FIG. 11 shows a logical structure of the merchant display card of FIG. 10.

The logical structure of such a merchant card is illustrated in FIG. 11. In addition to the secure keyboard 92 and the display 93 (generally a simplified display, as only limited information needs to be displayed), there are two main modules on the card: a merchant application (MA) 112 and a display controller (DC) 111.

The MA is a chip application that can communicate with both the DC and the CCR. Therefore, the MA is a dual interface (contact and contactless) chip application, which supports the following:

- (internally) A supplementary contact interface, which is referred to as the Control Interface 113, towards the DC. This interface allows exchanging C-APDU/R-APDU with the DC.
- (internally) A switching mechanism between a CCR interface 114 and the Control Interface.
- (externally) The CCR interface 114 supports both contact and contactless transactions through contact interface 116 and contactless interface 115.

The DC 111 implements a micro-terminal in the merchant card. It is programmed with a sequence of commands to enable fulfilment of the cardholder's PIN capturing and encrypting service. The DC interfaces internally to:

- MA 112 through the control interface 113.
- Merchant input interface through the secure keyboard, from where it captures the merchant input for:
  - Service choice, for example Amount Acknowledgement by cardholder, cardholder PIN keying, merchant pre-pay account balance display, or
  - Service data input, e.g., the transaction amount, the cardholder's PIN.
- Merchant output interface through the simplified display 93 to display service results, such as cardholder's encrypted PIN etc.

The MA is preferably an EMV chip application. It may be implemented by modification of an existing EMV chip application such as PayPass M/Chip 4 or M/Chip Advance, with an adaptation to support the supplementary Control Interface and to implement a cardholder PIN encryption mechanism. This may be done using M/Chip 4 technology by using the same processing steps for the cardholder PIN as for an amount in an offline transaction. The PIN is obtained and added to the COTA, which stores offline transaction amount data. The COTA is encrypted with the AC key—this is also available at the PSP, which has the corresponding master key in its HSM. After the successful decryption of the COTA, the HSM will obtain the PIN and encrypt it further with the relevant network key. The merchant card will receive the Issuer Authentication Data as ARPC and the PSP resets the counters so that COTA is prepared to receive the PIN of the following cardholder.

An exemplary approach to carrying out a payment transaction using this approach will now be described. This can be considered as a two-stage process.

In the first stage, the merchant enters the transaction amount on the merchant card keyboard, and this is shown on the merchant card display. The merchant card is passed to the cardholder, who verifies the amount and checks to make sure that the merchant card appears legitimate and uncompromised. The cardholder then types his or her own PIN used for verification into the secure keyboard of the merchant card. The merchant card then encrypts the cardholder PIN and links it to the transaction amount. The merchant card is returned to the merchant, who inserts it in the CCR (in some arrangements described below, the merchant card may be situated in the CCR throughout). The merchant card provides the encrypted cardholder PIN to the CCR, which forwards it to the PSP over the secure channel established using that merchant card.

In the second stage, the cardholder's chip card is inserted into the CCR (in most embodiments, but not all, described below the merchant card will first have to be removed). A normal EMV transaction is now performed, using the chip or even the magnetic stripe of the cardholder's card. The CCR forwards the ARQC and the content of the DE 55 (a data element defined in EMV) produced by the cardholder's chip card, or the content of the magnetic stripe of a non-chip card to the PSP over the secure channel established using that merchant card. The PSP can then produce the authorization request for the issuer host, and the transaction process then continues a conventional EMV transaction.

The acknowledgement of the transaction amount by the cardholder is significant in resisting attacks based on downgrading security and relaying transactions, because it protects against subversion of transaction details by a rogue merchant. The tamper protection provided in the display card provides security against the modification of its structure by the merchant, for example by a software or hardware modification that could actively modify the amount.

A full step-by-step approach of an exemplary embodiment is set out below.

1. After shopping is completed, the merchant enters the amount and currency of the current transaction on the merchant card keyboard for acknowledgement with a payment proof produced using the cardholder's payment card.
2. The merchant enters his or her own PIN on the merchant card keyboard. The PIN is verified locally by the MA, which if satisfied activates the merchant services available on the card.
3. If the current transaction is of high value (say, over 25 USD), the merchant hands the merchant card to the cardholder to capture the cardholder PIN as an acknowledgement of the current transaction.
4. The Cardholder enters the cardholder PIN on the merchant card secure keyboard and hands the merchant card back to the merchant. The MA application in the merchant card encrypts the cardholder PIN and stores it in the MA permanent memory. The DC receives confirmation of completion and may now display some confirmation of service completion, such as scrambled bytes of a cryptogram.
5. The merchant inserts the merchant card in the CCR. The CCR reads and stores the cardholder's encrypted PIN to add it to the cardholder transaction data when this has been captured. The CCR will also use the Application Cryptogram (AC) produced by the MA in the merchant card to initiate (if necessary) and operate a secure channel with the PSP.
6. The PSP (if necessary) establishes the secure channel and receives the transaction details (amount, currency) together with the encrypted PIN of the cardholder from the CCR. Using these transaction details, the PSP triggers an EMV transaction with the cardholder's payment card through the V-POS client (with CCR and network access device working in combination), providing it with the challenge to be signed.
7. The merchant withdraws the merchant card from the CCR and inserts the cardholder's card instead. Through the established secure channel the payment card is running an online EMV transaction. As a part of this process it reads the card's financial details (i.e., PAN, expiration date) and the CVM list. These are sent through the secure channel to the PSP's V-POS server.
8. The V-POS server determines from the CVM list received from the card and from the terminal capabilities (these will be known for the V-POS server), which is the correct Cardholder Verification Method to apply:
   a) If the chosen CVM is online PIN, the V-POS server opens the encrypted PIN, and re-encrypts it in its HSM with a proprietary algorithm and encryption keys according to the requirements of the proprietary payment network.
   b) If the chosen CVM is offline PIN, the HSM of the V-POS server will decrypt the envelope containing the encrypted PIN sent by the merchant card, then package it within a VERIFY PIN command, and submit it through the secure channel with the encryption service activated back to the CCR for execution at the cardholder card.
9. The V-POS system requires the cardholder card to produce an ARQC on the (amount, currency, V-POS server challenge) corresponding to the current transaction.
10. The MA provides the ARQC of the cardholder's card to the CCR, which then transmits it through the secure channel to the V-POS server.
11. The V-POS server assembles an authorization request message (0x100) to be provided to the acquiring network—the message incorporates:
    The card's financial details, such as PAN and expiration date.
    The ARCQ, which stands for the Card Authentication Method (CAM).
    Any other EMV data required in the DE 55 field of a chip authorization request.
    Eventually, the re-encrypted PIN as obtained at step 8a.
12. The acquirer propagates the authorization request (0x100) on the payment network to the issuer.
13. The Issuer Host processes the authorization request processing as for a conventional transaction—depending on the results of the ARQC verification, on the online PIN verification in the HSM, and on the financial status of the cardholder's account, the Issuer Host approves or declines the transaction.
14. The Issuer Host sends back the authorization response to the acquirer and this is forwarded on to the PSP's V-POS server.
15. In its turn, the PSP forwards a "YES/NO" answer to the Lite POS—this is eventually followed by ARPC cryptograms and issuer scripts, if the transaction was carried over on the contact interface (again, this is just a matter of conventional EMV process).

This operational description is applicable when the cardholder's payment card is an EMV card, but a similar operational description can be used for a transaction conducted with a magnetic stripe card with modifications that will be readily apparent to the person skilled in the art. It is important to note that using this approach, magnetic stripe transactions are still protected against fraud if the online PIN is used as CVM.

The approach above uses a conventional design of CCR, with a single card reading slot. For low transaction volumes, use of a single card reading slot with switching of merchant and cardholder cards as necessary is a satisfactory solution. In an alternative approach, the merchant card could be incorporated within the CCR during the transaction.

Figure 12:
FIG. 12 shows an alternative design for the merchant display card of FIG. 10.

An embodiment using such a CCR involves several modifications, most particularly the use of two card readers, with one slot assigned for the merchant card and the other for the cardholder's payment card. It should still be possible for the merchant card to be removed for inspection by the cardholder to check for card authenticity and integrity. The merchant card slot is arranged so the secure keypad of the merchant is accessible for use by the merchant and by the cardholder even when the merchant card remains inserted in the CCR. The slot may for example be oriented such that the merchant card display is visible through in an opening on a rear side of the CCR, with the keyboard is accessible on the same side. The customer card slot may be arranged conventionally, as there are no particular design constraints associated with it. An alternative merchant display card 120 optimised for this approach is shown in FIG. 12—the keyboard 122 and the display 123 are arranged to the side of the card and away from the chip 121 to allow effective user interaction with the card even while the chip 121 is being read.

The approval process for a POS typically requires certification under the PCIDSS suite of standards, which include PCI PST, PSI E2EE, and PCI DSS. Two preferred design solutions for implementing a Lite POS at the merchant POI in a V-POS architecture which both address the identified threats and potential attacks and also would achieve appropriate certification are the following:

CCR with PED and merchant card
CCR with CVM-enabled merchant card

Further considerations for each solution are briefly discussed below.

CCR with PED and merchant card—This solution is the closest to a conventional merchant POS, differing only in using the secure channel to the CCR by means to merchant card to provide communication with the PSP. The main practical difficulty is to provide a PED at a price that is not prohibitive, given the physical and logical security requirements of such a device.

Figure 13:
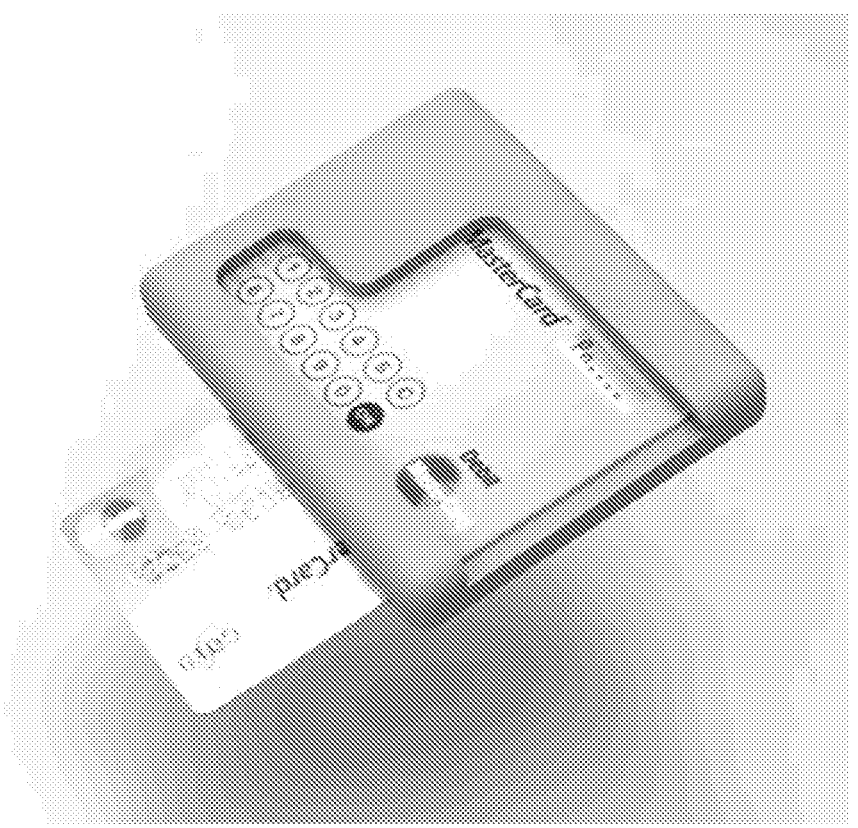
FIG. 13 illustrates a dual slot chip card reader for use in embodiments of the disclosure.

CCR with CVM-enabled merchant card—This requires the CVM-enabled merchant card described above, but can be implemented with a conventional one-slot CCR or a two-slot CCR. This approach appears to be the most preferable, as it provides an effective mechanism for cardholder acknowledgement of the transaction and provides good guarantees against subversion for the cardholder and all other parties to the transaction. The two-slot CCR appears to be a particularly desirable design solution. An exemplary physical embodiment of a two-slot CCR is shown in FIG. 13, with a first slot 131 for the merchant display card (allowing access to the merchant display card secure keypad and display) and a second slot 132 for the cardholder card.

The embodiments described above are primarily directed to the use of a PC or other computing device as a network access device. As discussed above, the computing device may also be a smartphone. Where the network access device is a smartphone and the merchant POS is designed for accepting contactless payments using NFC (for example from PayPass cards and from mobile phones), a different type of embodiment may be preferred. An alternative architecture for this purpose is described below with reference to FIGS. 14 to 20.

In these embodiments, the smartphone is upgraded with an integrated slot into which a merchant display card with secure keyboard can be placed—this merchant card can serve as a removable Secure Element (SE). As in the CCR embodiments described above, the slot is oriented such that the merchant card has the secure keyboard and display visible and available for use by a cardholder.

The NFC enabled smartphone works in the "Reader Mode"—this device is here termed an M-POS. Instead of having a separate CCR sleeve connected to it, the smartphone incorporates a contactless front end and an NFC Controller to together implement a contactless CCR inside the smartphone.

Figure 14:
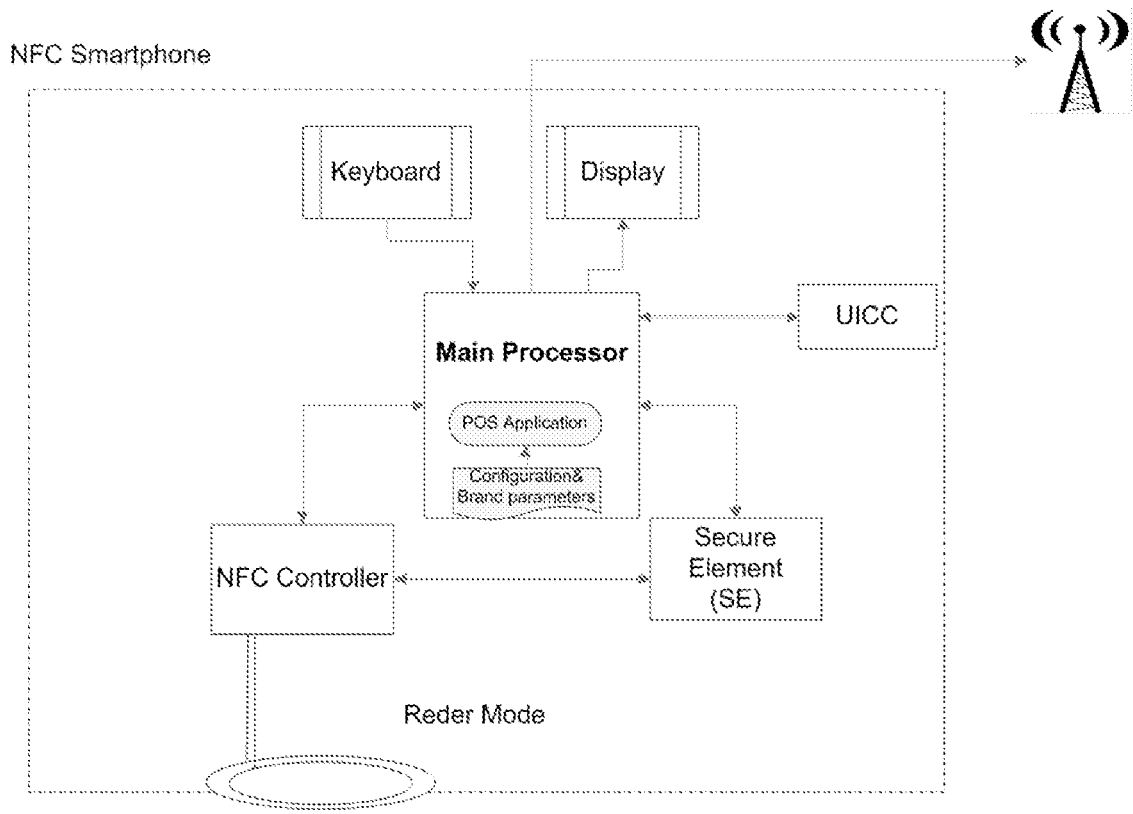
FIG. 14 illustrates schematically elements for use in embodiments of the disclosure where a merchant uses a smartphone as a network access device.

The elements of such a NFC enabled smartphone adapted for use as a POS are shown in FIG. 14. The smartphone 140 has a main processor 141 running applications including a POS application. The main processor 141 interacts with a NFC controller 142, with the smartphone operating in "Reader Mode", and with the NFC controller 142 in communication with an antenna 148. A secure element 143 interacts with the NFC controller 142 and the main processor 141, as will be described below. The smartphone 140 has a UICC (or SIM card) 146, a display 144 and a keyboard 145, and is in communication over a cellular communications network with a base station 147.

In this environment, the array of threats differs slightly from that in a PC-based environment. Subversion of the smartphone display or keypad (or logging of keytaps) provide threats, as do the possibility of malware in the main processor or NFC controller. An important line of defence is the provision of a trusted execution environment (TEE) for certain security sensitive key functions.

Figure 15:
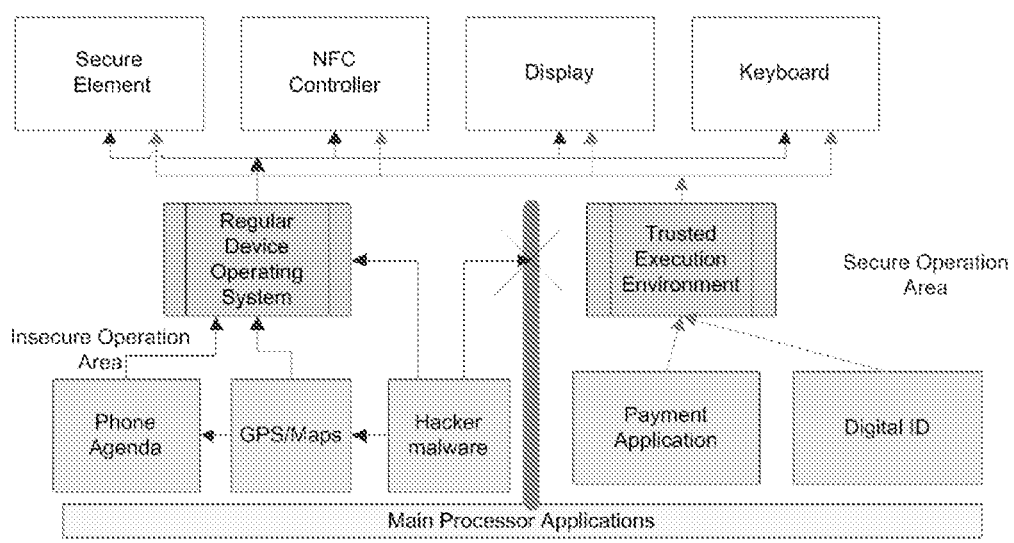
FIG. 15 shows schematically the separation of the operating system of a smartphone into a regular operating system submitted to security threats and a Trusted Execution Environment with secure operation of financial data.

This division between operating environments is shown logically in FIG. 15. There is a logical wall 152 between the regular device operating system 150, interacting with the system components identified in FIG. 14, and the trusted operating environment 151, meaning that malware 157 cannot penetrate into the trusted operating environment. Applications such as the main phone applications 155, GPS/Maps 156, and the main application layer 158 operate with the regular device operating system, with only a limited range of applications which need to be secure such as a payment application 153 and a digital ID 154 operating in the trusted operating environment 151. Results can be provided from the trusted operating environment 151 for provision to other elements of the system (for example, for display on smartphone display 144), but inputs will not be received from the regular device operating system 150.

Figure 16:
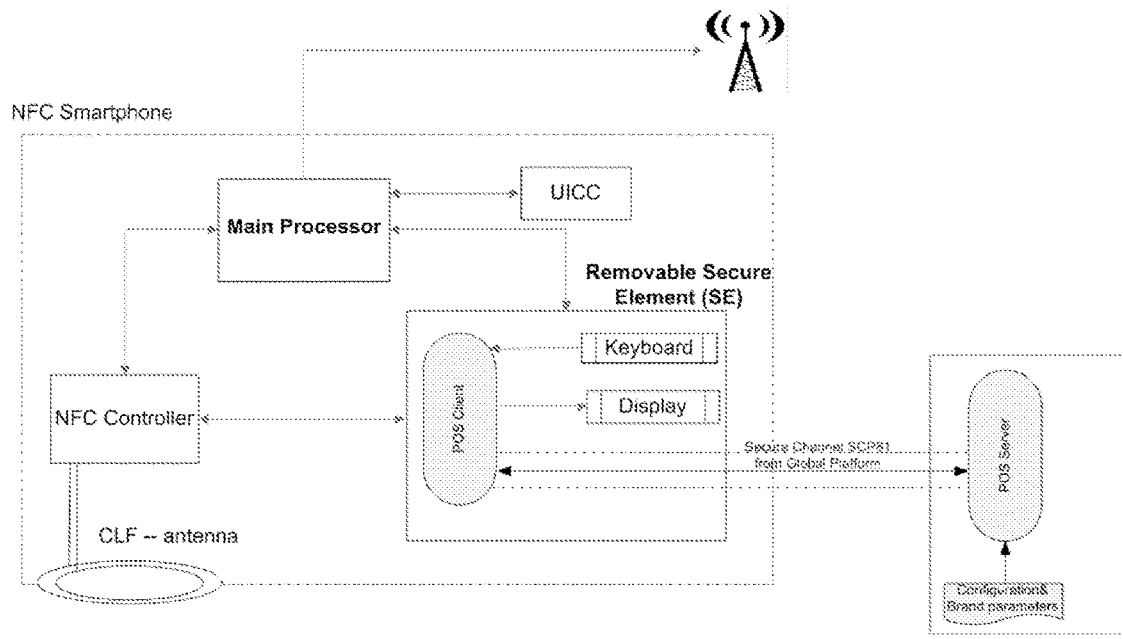
FIG. 16 shows schematically the implementation of a Trusted Execution Environment (TEE) of FIG. 15 in a Removable Secure Element (RME) implemented as a Merchant Display Card with Secure Keyboard, and the interaction of the virtual POS client system of FIG. 15 with a POS server according to embodiments of the disclosure.

As described above, a V-POS solution for mobile payments according to embodiments of the invention provides a merchant display card as a removable element providing a trusted operating environment. This is shown in FIG. 16. FIG. 16 shows the use of a merchant display card 160 as removable secure element (SE), including a processor and memory providing the POS client 163, and comprising a secure keyboard 161 and a display 162 as before. Physically, the connection between the merchant display card 160 and the smartphone could be achieved not only by an integrated slot in the smartphone, but also by an appropriate sleeve for retaining the card on the smartphone and a wired connection to a smartphone port (such as the USB port). As is discussed below, a sleeve may already be required for signature capture, in which case the two sleeves may be integrated together in one physical device.

The remainder of the V-POS solution is essentially as is shown for other embodiments with a PC as the network access device. A secure channel is established as before between the V-POS client 163 and the V-POS server 164 provided as part of the PSP server.

Figure 18:
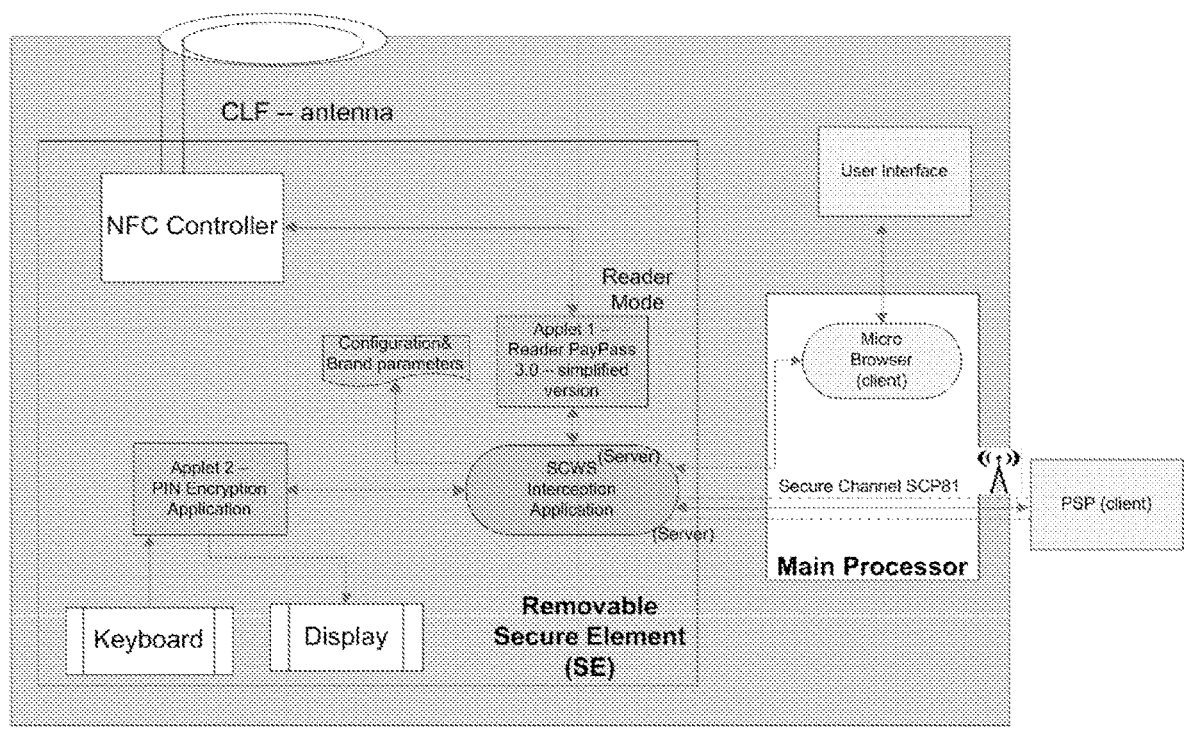
Figure 19:
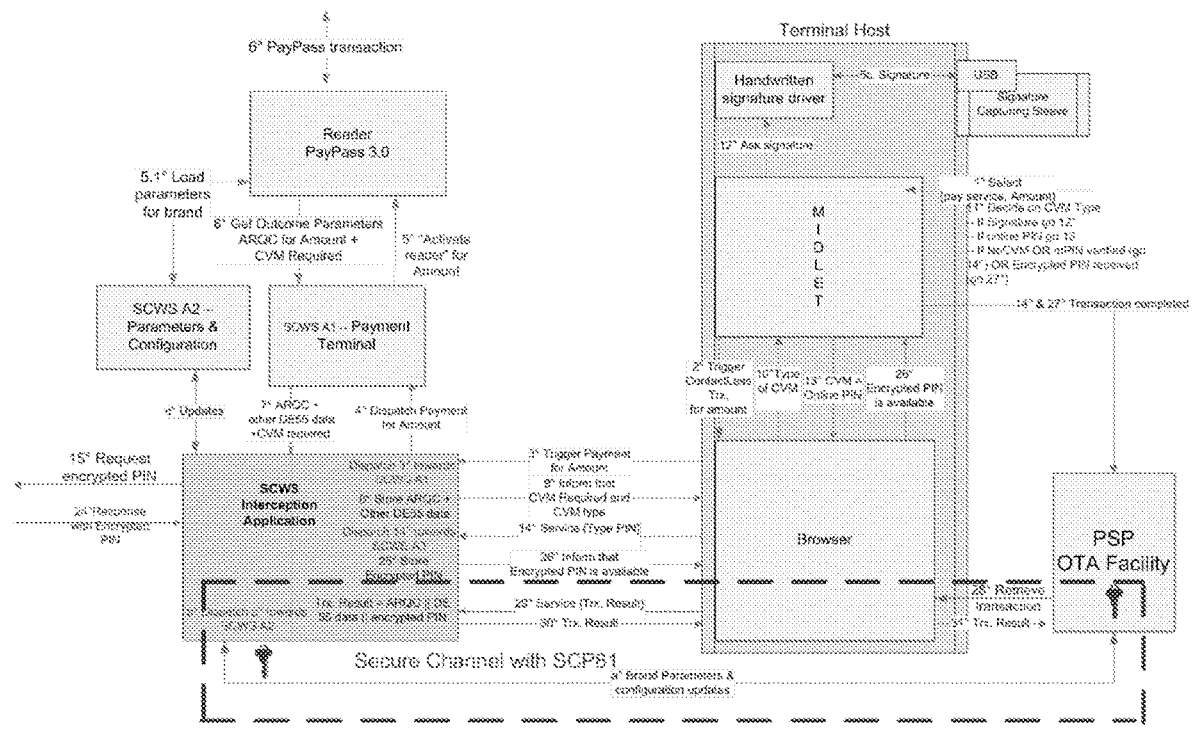
FIG. 19 illustrates a transaction flow for payment in the embodiment shown in FIGS. 17 and 18.
Figure 20:
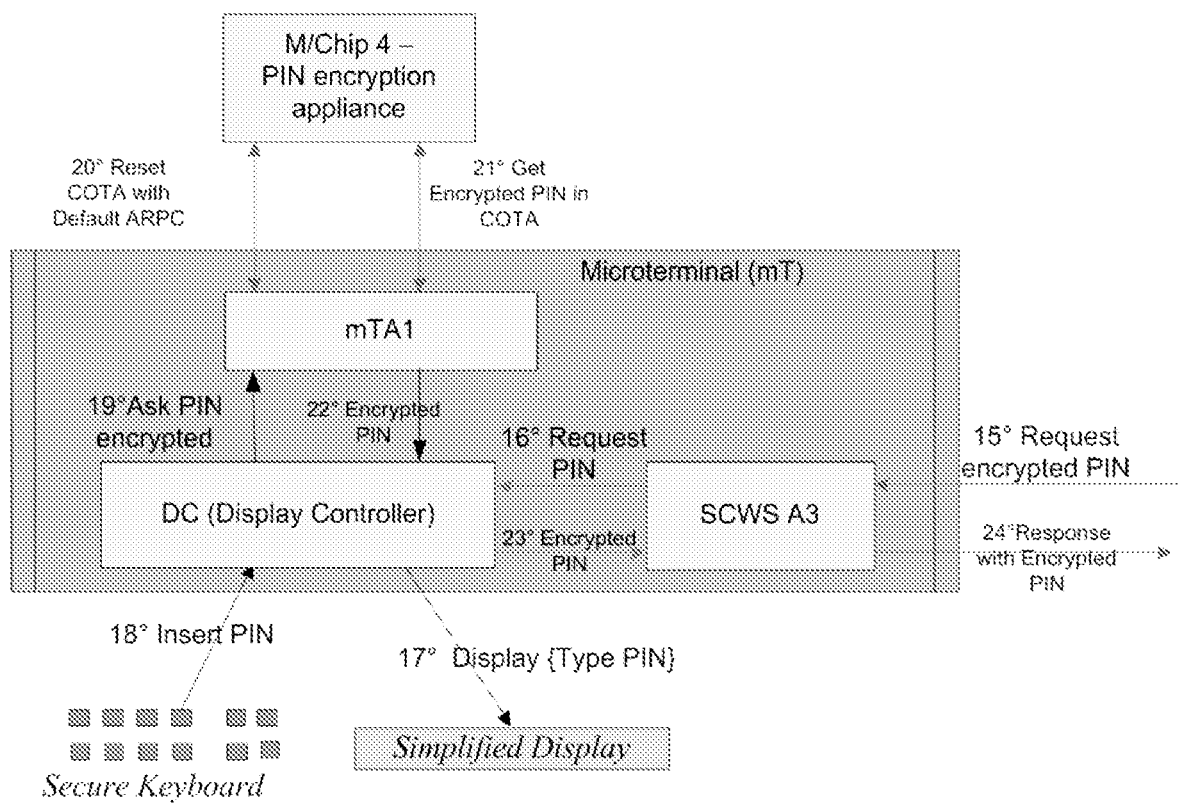
FIG. 20 shows separate elements of the merchant display card of FIGS. 17 and 18 and their participation in a transaction flow for payment.

FIGS. 17 to 20 describe the removable secure element of the smartphone V-POS embodiment described above in more detail. FIG. 20 shows the main functional elements present in the secure element. As with other embodiments of a merchant display card, there are a secure keyboard 201 and a simplified display 202, interacting with a display controller 204. The display controller is one element of a microterminal (mT) 203, containing two other main functional blocks. One microterminal block 206 interacts with the PIN encryption appliance, in this case an instance 207 of M/Chip 4 repurposed to provide encryption as described in an exemplary embodiment above. The other functional block, which is a Smart Card Web Server appliance (SCWS A3) 205 is responsible for the secure channel.

Figure 17:
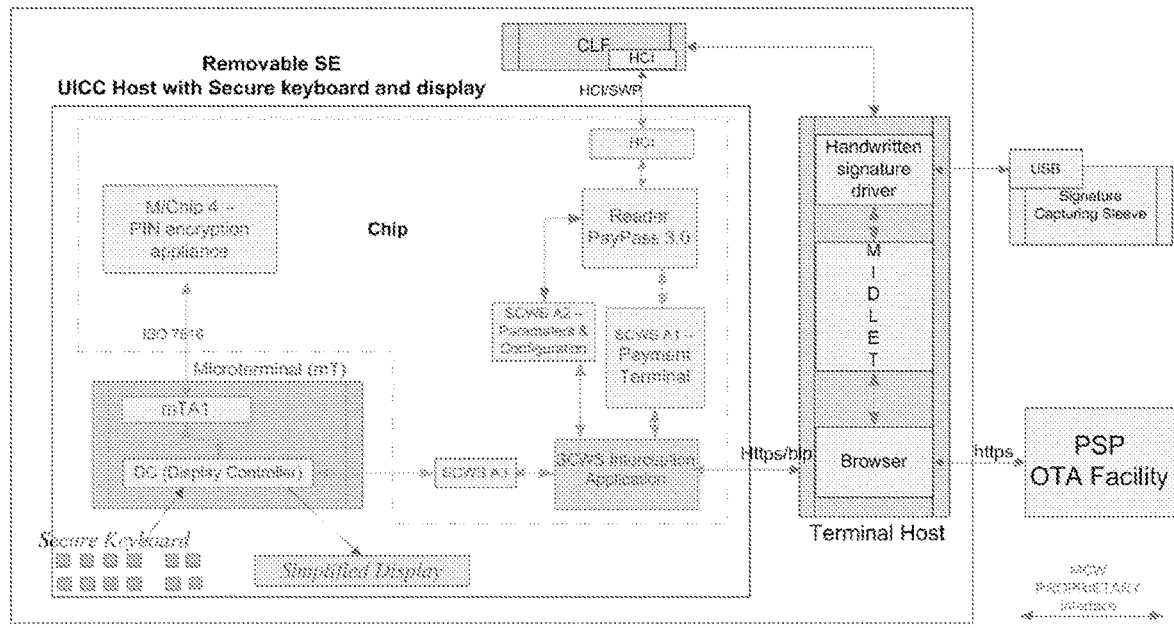
FIGS. 17 and 18 describe in more detail the implementation of a merchant display card as a secure element in a smartphone implementation of a virtual POS system according to embodiments of the disclosure.

The secure element of FIG. 20 is placed in the context of other system components in FIG. 17. The secure element 173 interacts with the NFC controller 177 and with a terminal host 174 which mediates communication to the PSP over the air (OTA) facility 175 over the secure channel, and which also contains a handwritten signature driver interacting over a USB connection with a signature capture device 176. FIG. 18 provides an alternative representation of this arrangement which shows separate logical blocks, linking the elements of FIG. 17 to those shown in FIGS. 14 and 16. This arrangement, in addition to illustrating positively the user interface 181 of the smartphone interacting with the main processor of the smartphone 141 implementing the terminal host, shows the secure channel in more detail. This is implemented as a server on the secure element, and communicates via a browser in the terminal host with a client at the PSP 182. This is a variation to the V-POS architecture—however, there may still be considered to be a V-POS server at the PSP and a V-POS client in the merchant display card, although some functional roles have changed.

This different structure is chosen in this embodiment because of the short interaction time of a "tap and go" contactless payment—the same V-POS architecture as previously described for other network access devices could however also be used here if required. The approach chosen avoids the risk that containing most of the payment logic in the remote PSP v-POS server and accessing it by tunnelling using the v-POS client could lead to too many interrupted transactions.

A POS application has thus been moved into the removable secure element. FIG. 18 illustrates the POS application as consisting of a combination of a Smart Card Web Server (SCWS) Interception application, which only receives the outside http commands and direct them to the appropriate SCWS appliances, and the SCWS appliances themselves. One of these SCWS appliances is Applet 1, which is the POS application itself, running as a tandem (Terminal, PayPass Reader 3.0). "Configuration and Brand parameters" provides a static parameters table to the reader, which determines its behaviour per brand. Its content is only intermittently updated in the removable secure element, when operational modifications are imposed by the PSP. The other SCWS appliance mentioned is Applet 2, which provides basic functions of the merchant display card with a secure keyboard for encrypting the online PIN of the cardholder.

It should be noted that SCWS technology is one exemplary technology for use for this purpose—it is advantageous as it is easy to integrate in existing http developments.

FIG. 19 shows in more detail a transaction flow using the arrangement shown in FIGS. 14 to 18 and 20. The separate transaction steps generally correspond to those discussed above for other V-POS embodiments, with modifications generally required for mobile contactless transactions and with inclusion of a signature check—the individual transaction steps are numbered in FIG. 19 in transaction order and the operation of each step will be apparent to the person skilled in the art with reference to the teaching above relating to V-POS and with reference to published prior art relating to PayPass and mobile contactless payment generally.

There are a variety of possibilities for distributing the components of this system. One possibility is for a CCR manufacturer to sell CCR devices to a PSP, which then uses a CCR manufacturer or vendor specified interface—this could result in a PSP needing to run a large number of V-POS servers. Alternatively, if the PSP designs and controls the specification, the PSP may only need a single V-POS server but the CCR vendor may need to produce CCRs to many different specifications.

Figure 21:
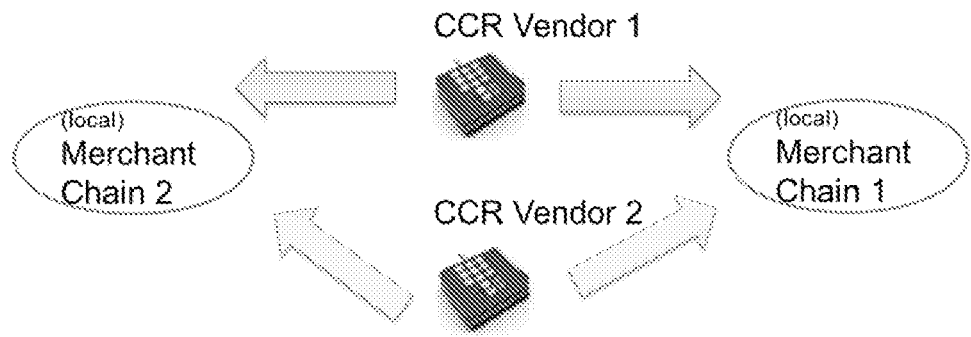
FIG. 21 shows distribution options for CCRs for use in embodiments of the disclosure.

The preferred approach is to have an open model based on a reference CCR, its software components, and the corresponding V-POS Server. This approach has the advantage of minimizing the overall ecosystem costs. In this open availability model, CCRs are available to be bought by merchants through distribution channels specific to the CCR vendor as illustrated in FIG. 21.

The CCR is not parameterized with cryptographic keys before distribution in this model. This may be managed as part of the registration process of the merchant with the PSP.

The registration of a merchant with the PSP consists of:
Enrolling the merchant in the V-POS Server database; this consists of creating the merchant account, and providing the necessary keying material for secure tunneling operation, for the online PIN encryption/decryption, etc.
Providing the merchant with the correctly parameterized CCR in the V-POS client configuration.

Figure 22:
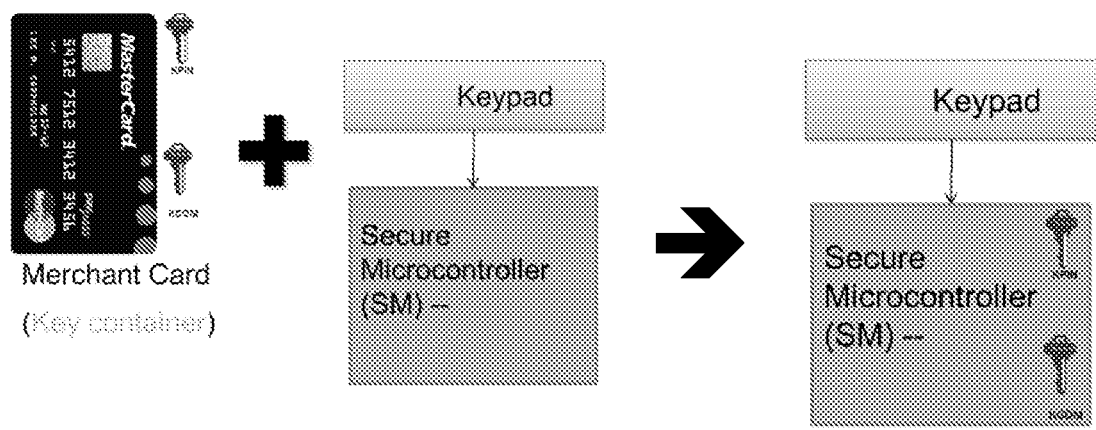
FIG. 22 illustrates the use of a merchant card for initialising a CCR in embodiments of the disclosure.

This is again preferably an open process, though a proprietary process for each PSP is possible. One possibility in an open process would be for the merchant to connect the CCR to a NAD such as a smartphone to allow downloading of parameters from a V-POS server. However, instead of relying on the merchant logging on to the PSP's V-POS Server and downloading the parameters remotely for its CCR, the merchant may use the merchant card distributed by the PSP to upload the operational parameters needed by the CCR from the merchant card chip. This is performed through an "Initialization procedure" preceding the actual use in payment transactions, as shown in FIG. 22.

Figure 23:
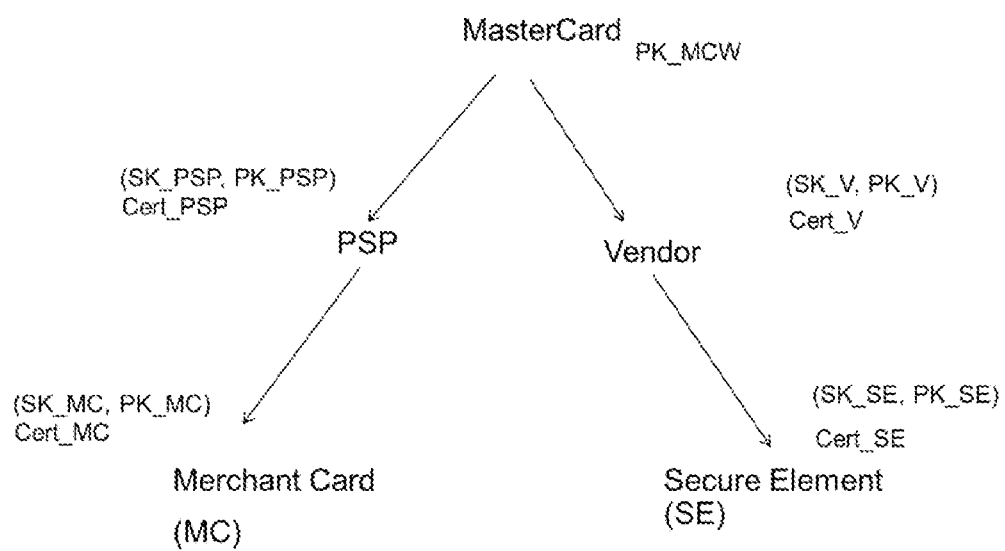
FIG. 23 shows a public key certification hierarchy used in embodiments of the disclosure for initialization of a CCR with a merchant card.
Figure 24:
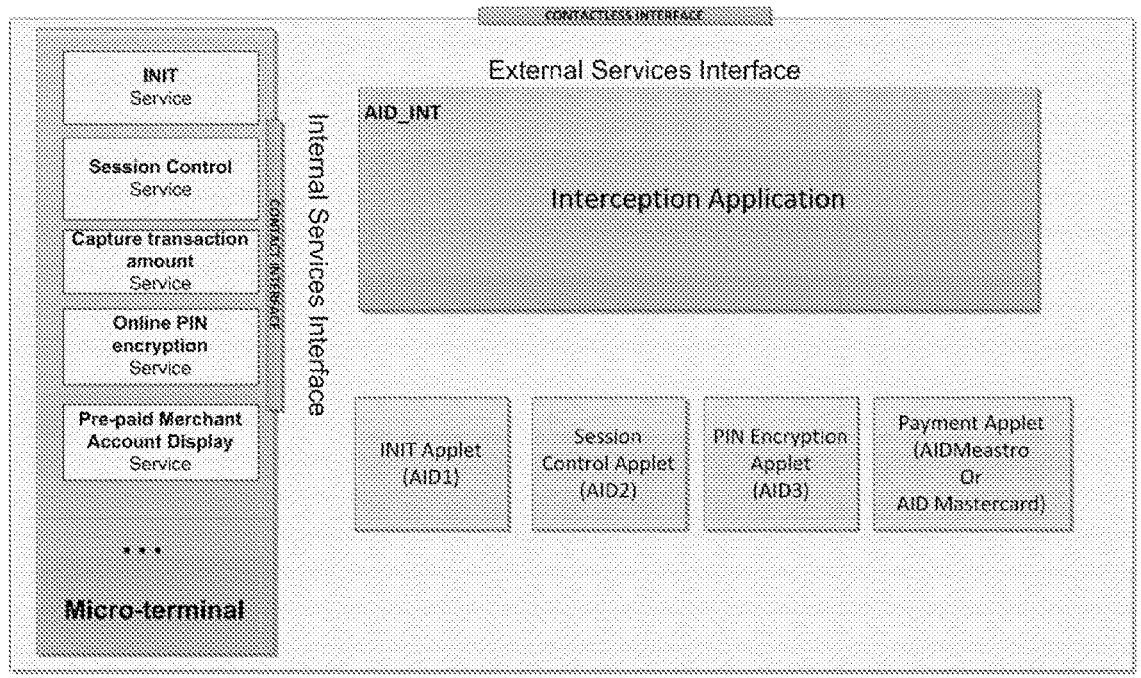
FIG. 24 shows a logical structure of a merchant card according to an embodiment of the disclosure.
Figure 25:
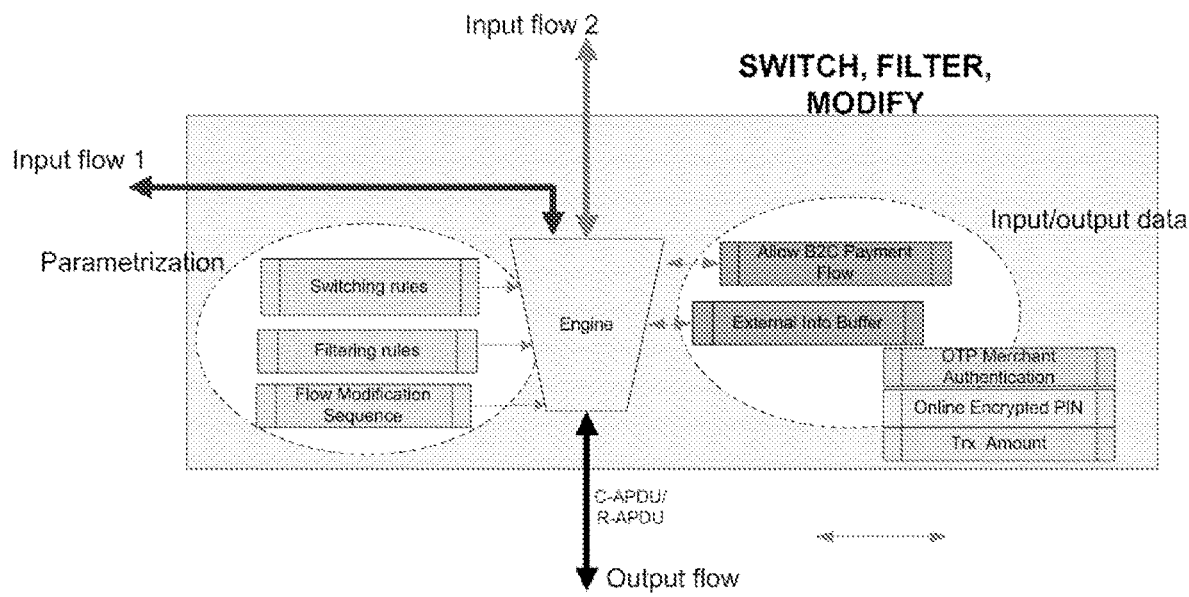
FIG. 25 shows in further detail the interception application depicted in FIG. 24.

An exemplary initialization procedure is shown in more detail in FIGS. 23 to 25. In these figures, the merchant card is shown as providing the parameters to a secure element (SE). In the arrangement shown here, this may be an SE within the CCR, though in alternative embodiments where the merchant's mobile telephone handset is used as a key repository, the SE may be within a mobile telephone handset.

The goal is the loading of the SE with the merchant subscription parameters as personalized by the PSP in the merchant card (MC). In particular, these comprise initial cryptographic parameters to establish a secure channel. These merchant subscription parameters may be provided in a template form, indicated below as MSP_Template. This may include data objects that will appropriately encode: HTTPS Client Certificate; HTTPS Client Private Key; and V-POS Server Public Key.

FIG. 23 shows a public key certification hierarchy used in this approach. The keys provided are as follows:

MC—The PSP has an RSA key pair (private key SK_PSP, public key PK_PSP). PK_PSP is certified by an appropriate trusted party. This certificate is referred to as: Cert_PSP=Sign [MCW](PK_PSP)

SE—The Vendor for the CCR has an RSA key pair (private key SK_V, public key PK_V). PK_V is certified by an appropriate trusted party. This certificate is referred to as: Cert_V=Sign [MCW](PK_V).

The public key of the trusted party (PK_MCW) is loaded in an authentic way in both the MC and SE. The MC has an RSA key pair (private key SK_MC, public key PK_MC). PK_MC is certified by the PSP. This certificate is referred to as: Cert_MC=Sign [PSP](PK_MC).

The SE has an RSA key pair (private key SK_SE, public key PK_SE). PK_SE is certified by the Vendor. This certificate is referred to as: Cert_SE=Sign [V](PK_SE)

The merchant may interact with the merchant card by using a merchant card keyboard, if present, or otherwise by using a personal card reader.

Figure 26:
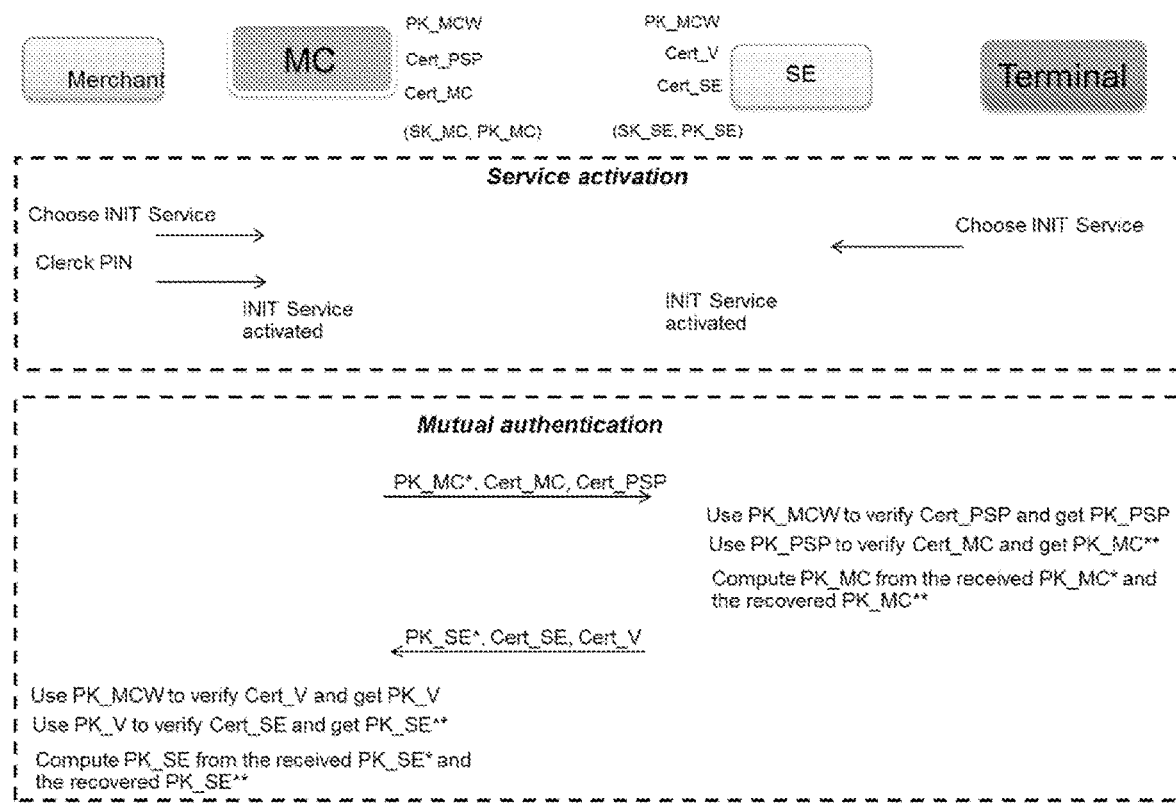
FIGS. 26 and 27 illustrate in detail an exemplary process for initializing a CCR with a merchant card.
Figure 27:
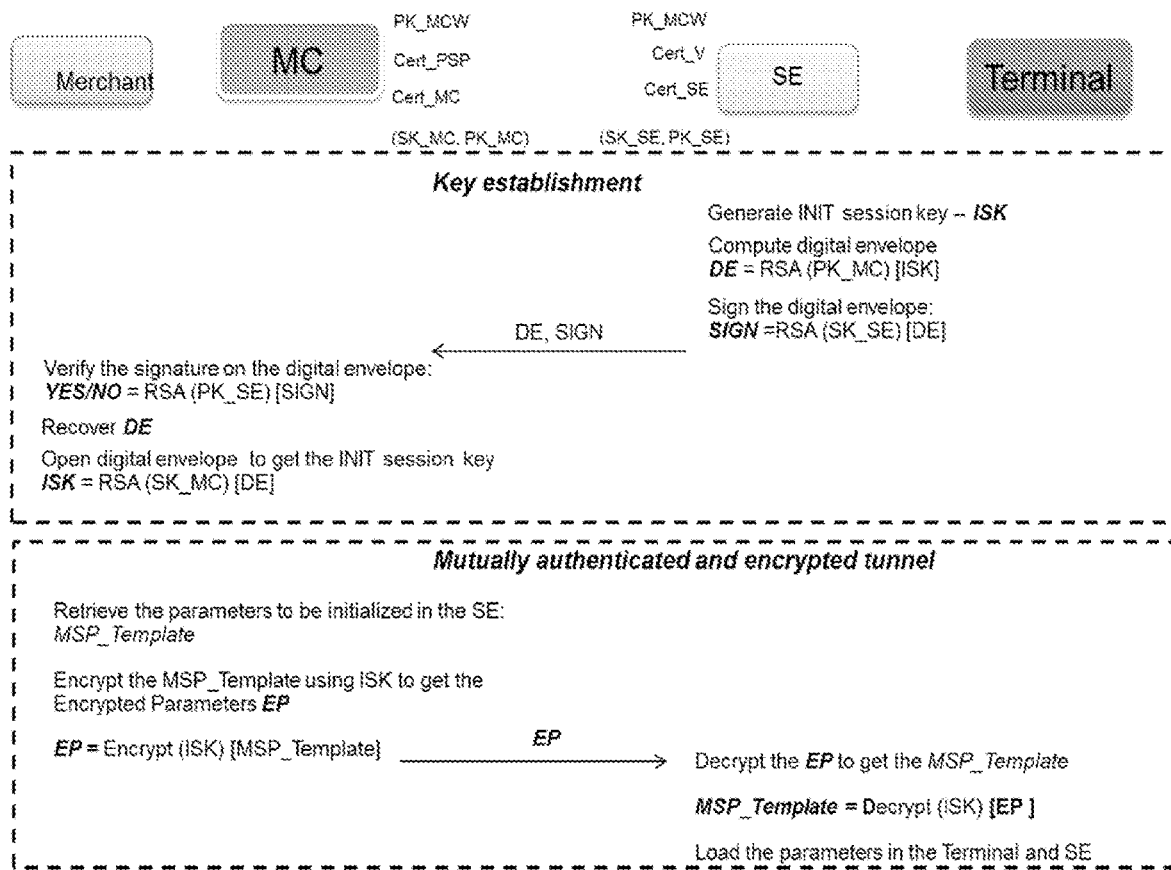

An initialization protocol INIT is shown in FIGS. 26 and 27 and described further below. This is considered in association with an exemplary structure for a merchant card as described in FIGS. 24 and 25.

FIG. 24 shows an exemplary structure for a merchant card. The MC implements a micro-terminal, powered up by the internal battery of the card, which is linked to the card's keyboard and card's display. The micro-terminal implements a number of services that allows the merchant the following capabilities:

Configuring the Merchant POS (INIT service)—This provides a bare minimum of configuration data sufficient to enable communications with a server to download the full configuration online and link to a PSP.

Initiating payment sessions with the V-POS Server (Session Control service)

Displaying for the cardholder the payment amounts and confirming them with a PIN (Capture transaction amount service and Online PIN encryption service)

Displaying the balance of the pre-paid Merchant account (Pre-paid Merchant Account Display service)

The MC contains several applets, which are here presented as separate logic. In practice, several of these applet functionalities may be implemented in one single application.

Interception Application The basic functionality provided here is that requests coming from the external services interface are forwarded to the INIT applet only after the Clerk PIN was successfully presented by the Merchant to the INIT service in the micro-terminal. The Interception Application may also block any requests coming from the external services interface to the Payment Applet, if the merchant did not complete a screening procedure imposed by the PSP (e.g., giving a valid identity, a TVA number, a permanent address, etc.).

INIT This applet is responsible for initiating the configuring of the Chip V-POS with the subscription parameters of the PSP the first time the Merchant steps into the system.

Session Control This applet is responsible for the session management between the VPS client and server running at the PSP for each session established by the merchant for receiving payments. The session can be triggered for each and every payment transaction, or may be triggered once for several payment transactions in the row or during a certain time interval. This application is also used to provide a One-Time-Password that will dynamically authenticate the merchant during the establishment of the secure channel of communication between the V-POS client and the PSP server during a session.

PIN Encryption Applet This application may be used for the local encryption in the merchant card of a cardholder PIN captured for high value transactions and for making it available to the PSP.

Payment Applet This is an EMV pre-paid application that may be used by the merchant for making payments at a POS or for withdrawing money at an ATM using his merchant card, after appropriate PSP control and explicit switch activation in the Interception Application (see "Allow B2C Payment Flow" in FIG. 25 below, and the discussion further below).

The Interception Application will now be described in more detail with reference to FIG. 25. This is a multiple interface application that bridges between:

The external services interface (contactless) for communication with a reader.

The internal services interface (contact) to communicate with the micro-terminal in the display card that implements the merchant card.

The various servers like the INIT applet (AID1), session management applet (AID2), PIN encryption applet (AID3), and the payment applet (AID Maestro or AID MasterCard).

The core of the interception application consists of an engine that performs switching, filtering, and transaction flow. The engine fulfills the following functions:

Command/response (C-APDU/R-APDU) flow switching

External flow sniffing, capturing, and eventually modifying

Cryptographic server for verifying authenticity and eventually decrypting content received from host for displaying on the DCK.

The step-by-step description of the INIT protocol is given below with reference to FIGS. 26 and 27:

1. The Merchant activates the corresponding INIT service on the CCR. The SE is ready for interaction—as a reader—with the MC.

2. The Merchant chooses the INIT service on MC.

3. The Interception Application allows the flow coming from the INIT service in the micro-terminal to select the INIT applet in the MC's chip but blocks any external access to the INIT applet.

4. The Merchant uses his PIN to authenticate.

5. If the PIN authentication is successful, the Interception Application unblocks the flow coming from the INIT service in the Terminal to select the INIT applet in the MC's chip and perform the INIT process. The MC is ready for interaction—as a card—with the SE.

6. The SE gets from the MC the PK_MC and its certificate chain, namely Cert_MP and Cert_PSP. The SE uses the PK_MCW to verify the Cert_PSP, and uses the certified PK_PSP to further verify Cert_MP and authenticate the PK_MC.

7. The MC is provided by the SE with the PK_V and its certificate chain, namely Cert_SE and Cert_V. The MC uses the PK_MCW to verify the Cert_V, and uses the authentic PK_V to further verify Cert_SE and authenticate the PK_SE.

8. The SE freshly generates an INIT session key (ISK) as an AES key.

The SE creates an RSA digital envelope DE containing the ISK, using PK_MC: DE=RSA(PK_MC)[ISK]. The SE generates a signature SIGN on the DE, using its private key SK_SE: SIGN=RSA(SK_SE)[DE]. The SE provides the MC with the DE and SIGN.

9. The MC receives the DE and SIGN. The MC verifies the signature SIGN on the DE, using PK_SE: YES/NO=Verify (PK_SE)[DE]

If the signature on DE verifies correctly, the MC opens the digital envelope DE containing the ISK, using SK_MC: ISK=RSA-1(PK_MC)[DE]

The MC may use the ISK to encrypt the MSP_Template.

10. The SE retrieves the encrypted MSP_Template.

The SE uses ISK to decrypt the encrypted MSP_Template and upload the resulting parameters (HTTPS Client Certificate, HTTPS Client Private Key, V-POS Server Public Key).

As noted above, this merchant card arrangement supports the use of the merchant card as a transaction card for the merchant. The merchant may thus use the same merchant card also for getting access to his merchant account kept with the PSP/V-POS Server in B2C electronic payments (POS, ATM), or in online banking.

Preferably, the use of the merchant card to get money from a merchant account is only carried out after a screening procedure performed by the merchant using a specialized Internet service provided by the PSP. In this procedure, the merchant is required to provide identify information, TVA number and so on, to establish that this is an appropriate payment channel. After verification by the PSP, if the merchant is found to be eligible to participate in the system, then the merchant card will be activated for B2C payments and online banking.

To this end, the PSP will send a script with a PUT DATA command to the tag of the container Allow B2C Payment Flow in the External Info Buffer (see FIG. 25) in the Interception Application to set its value to allow the C-APDU/R-APDU flow to reach the Payment Applet (AID Maestro or AID MasterCard).

As the person skilled in the art will appreciate, modifications and variations to the above embodiments may be provided, and further embodiments may be developed, without departing from the spirit and scope of the invention. Reference to standards and proprietary technologies are provided for the purpose of describing effective implementations, and do not limit the scope of the invention.

Although the present disclosure has been described in connection with specific embodiments, it should be understood that various changes, substitutions, and alterations apparent to those skilled in the art can be made to the disclosed embodiments without departing from the spirit and scope of the disclosure as set forth in the appended claims.

The invention claimed is:

1. A secure payment system, comprising a merchant POS client and a remote POS server,
   wherein the merchant POS client comprises a reading device for reading a customer user token and for accepting transaction details and customer verification data and a computing device with access to a communications network and in communication with the reading device, and wherein the merchant POS client further comprises a merchant token associated with the remote POS server, and
   wherein the remote POS server is in communication with the merchant POS client through the communications network, and wherein the remote POS server, and not the merchant POS client, receives delegation of, and assures, security of at least two merchant assets including terminal configuration data and at least one of: payment provider brand parameterization data and code of a payment application for merchant POS client.

2. The secure payment system as claimed in claim 1, wherein the customer user token is a payment card and wherein the reading device comprises a card reader, and
   wherein the card reader comprises a chip card reader adapted to read an EMV chip.

3. The secure payment system as claimed in claim 1, wherein the remote POS server comprises payment logic for transactions received at the merchant POS client.

4. The secure payment system as claimed claim 1, further comprising a secure channel from the merchant POS client to the remote POS server, wherein the secure channel is established via a secure channel layer between the merchant POS client and the remote POS server.

5. The secure payment system as claimed in claim 4, wherein the merchant token associated with the remote POS server is used to establish the secure channel.

6. The secure payment system as claimed in claim 5, wherein the merchant token comprises a tamper responsive card.

7. The secure payment system as claimed in claim 6, wherein the merchant token is a merchant card, and the POS client further comprises a PIN encryption device.

8. The secure payment system as claimed in claim 6, wherein the merchant token is a merchant display card comprising a secure keyboard and a display.

9. The secure payment system as claimed in claim 8, wherein the merchant display card is adapted to receive and encrypt a PIN through the secure keyboard.

10. The secure payment system as claimed in claim 5, wherein the reading device is adapted to retain for reading both the merchant token and a customer payment card at the same time.

11. The secure payment system as claimed in 1, wherein the computing device is a smartphone adapted to receive contactless payments.

* * * * *